US006913492B2

(12) United States Patent
Kuroda et al.

(10) Patent No.: US 6,913,492 B2
(45) Date of Patent: Jul. 5, 2005

(54) CONNECTOR DEVICE FOR CARD INTO WHICH PLURAL KINDS OF CARDS OF DIFFERENT SHAPES CAN BE INSERTED

(75) Inventors: Yoshimasa Kuroda, Miyagi-ken (JP); Toshihisa Matsushita, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 2 days.

(21) Appl. No.: 10/744,828

(22) Filed: Dec. 22, 2003

(65) Prior Publication Data

US 2004/0137794 A1 Jul. 15, 2004

(30) Foreign Application Priority Data

Jan. 8, 2003 (JP) ........................................ 2003-001768

(51) Int. Cl.⁷ .............................................. H01R 24/00
(52) U.S. Cl. ...................................... 439/631; 439/630
(58) Field of Search ................................ 439/631, 630, 439/838, 159, 326, 74, 541.5; 361/737, 753, 735

(56) References Cited

U.S. PATENT DOCUMENTS

| 6,097,605 | A | * | 8/2000 | Klatt et al. ................. 361/737 |
| 6,206,710 | B1 | * | 3/2001 | Chen .......................... 439/159 |
| 6,386,920 | B1 | | 5/2002 | Sun |
| 6,402,529 | B2 | * | 6/2002 | Saito et al. .................... 439/74 |
| 6,468,101 | B2 | * | 10/2002 | Suzuki ......................... 439/326 |
| 6,524,137 | B1 | * | 2/2003 | Liu et al. ..................... 439/638 |
| 6,641,413 | B2 | * | 11/2003 | Kuroda ........................ 439/159 |
| 6,672,904 | B1 | * | 1/2004 | Chen ........................... 439/631 |
| 6,699,053 | B2 | * | 3/2004 | Kuroda ........................ 439/218 |
| 6,700,788 | B2 | * | 3/2004 | Matsushita et al. ......... 361/737 |
| 6,716,066 | B1 | * | 4/2004 | Kuo ............................ 439/630 |
| 6,717,805 | B2 | * | 4/2004 | Liu et al. ..................... 361/684 |
| 6,738,259 | B2 | * | 5/2004 | Le et al. ...................... 361/737 |
| 6,783,399 | B2 | * | 8/2004 | Joung ......................... 439/630 |

* cited by examiner

Primary Examiner—Alex Gilman
(74) Attorney, Agent, or Firm—Beyer Weaver & Thomas LLP

(57) ABSTRACT

The present invention is directed to a connector device for card, which can easily take out plural kinds of cards of different shapes mounted in a predetermined mount position. The connector device 1 for card according to the present invention comprises a housing 2, and a card insertion opening 2a for inserting a first wide and thick card 15 and a second narrow and thin card 16 into the housing 2, wherein the housing 2 is provided with a first ejection mechanism for ejecting the first card 15 inserted into the housing and a second ejection mechanism for ejecting the second card 16, and the second ejection mechanism is movable to a position which does not interfere with the insertion of the first card 15 when the first card 15 is inserted.

8 Claims, 24 Drawing Sheets

FIG. 3
FIG. 4
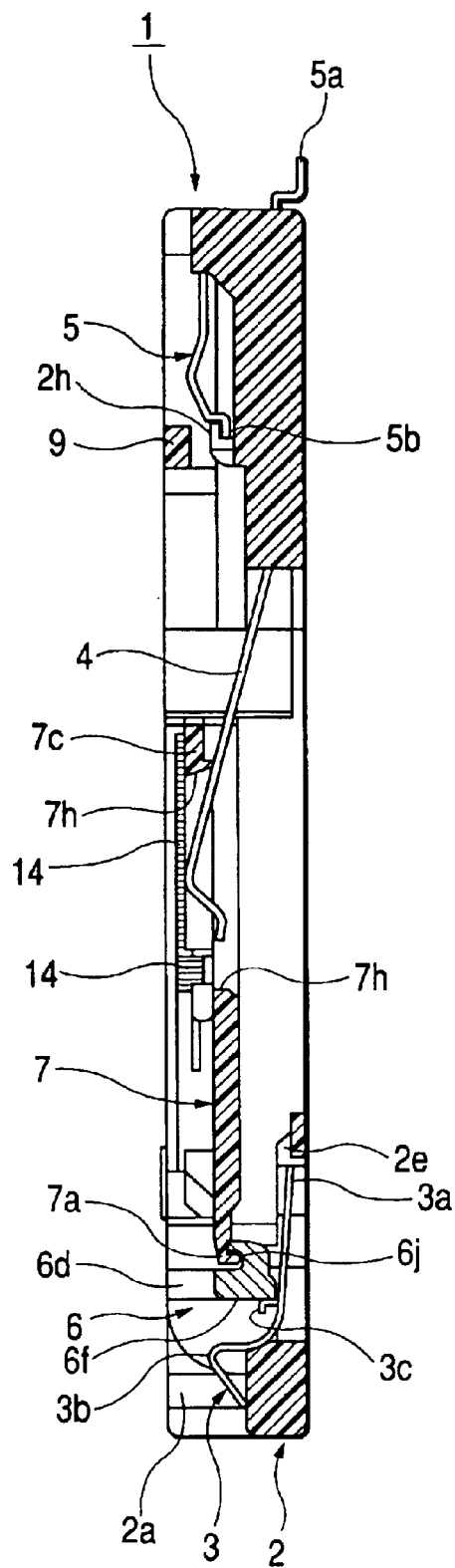
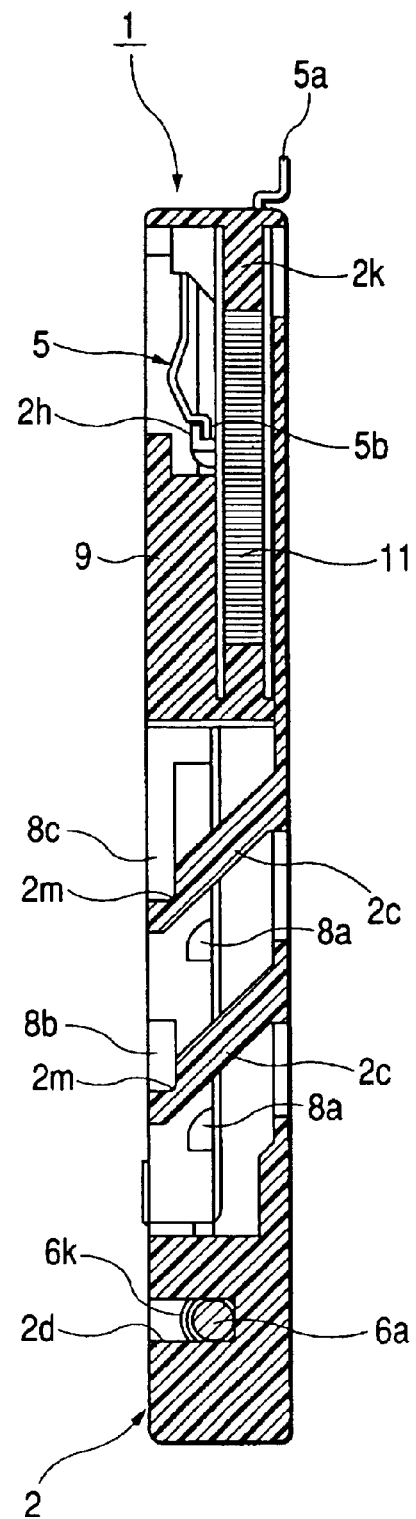

FIG. 7
FIG. 8
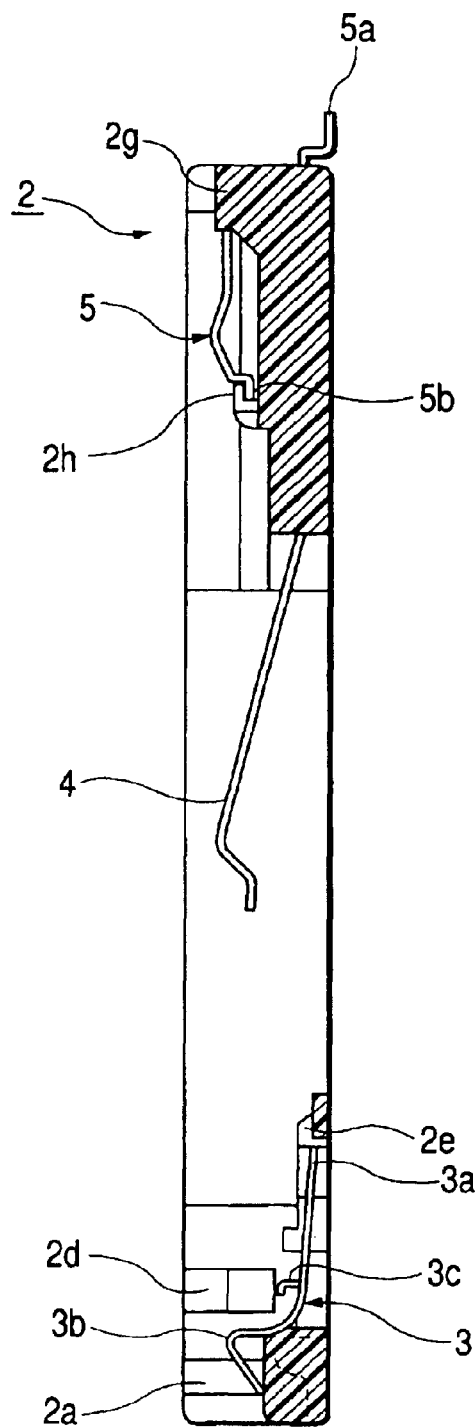
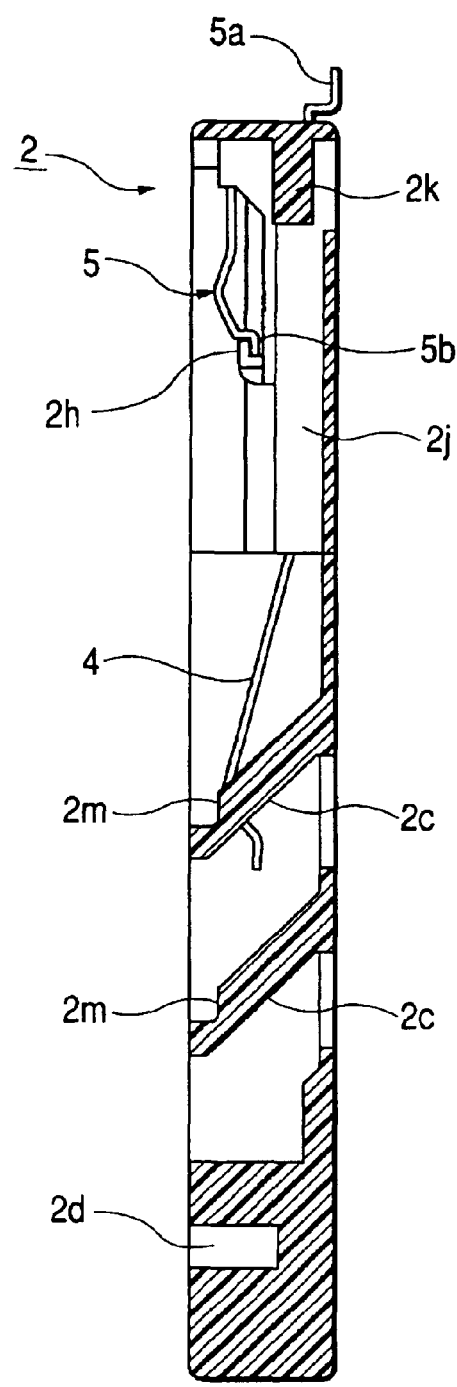

FIG. 22
FIG. 23
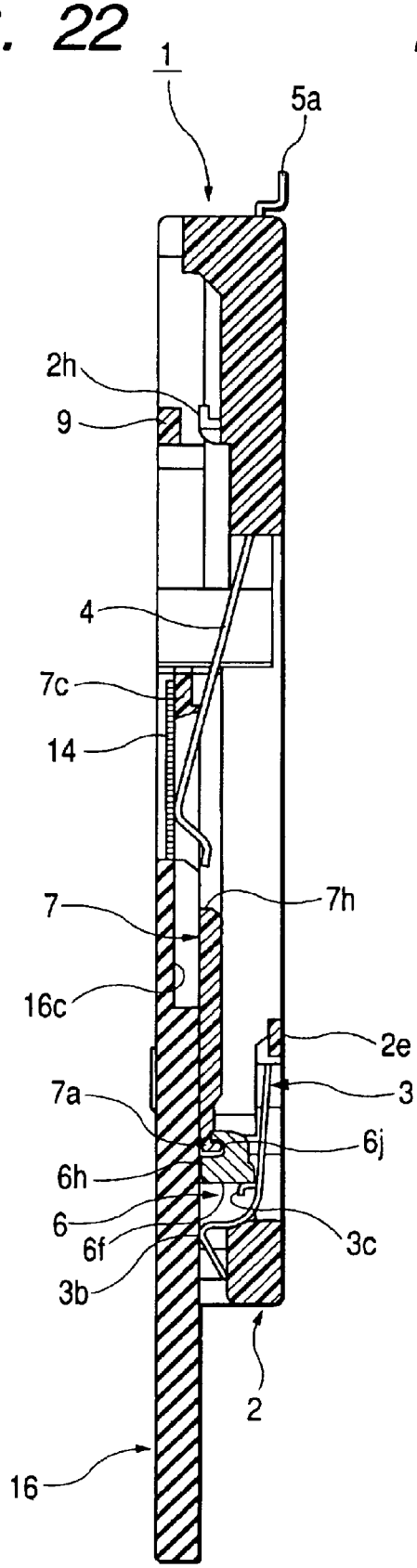
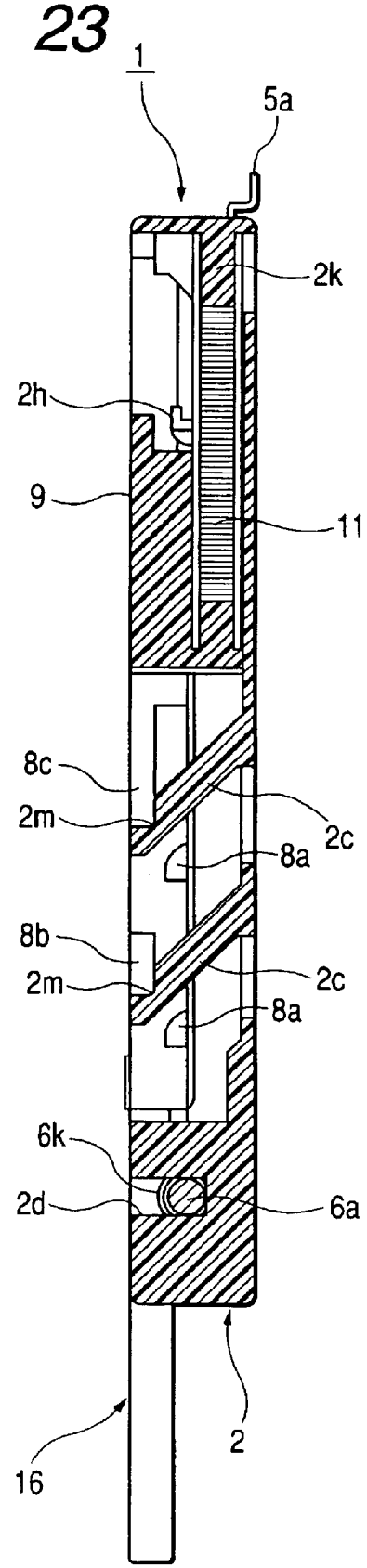

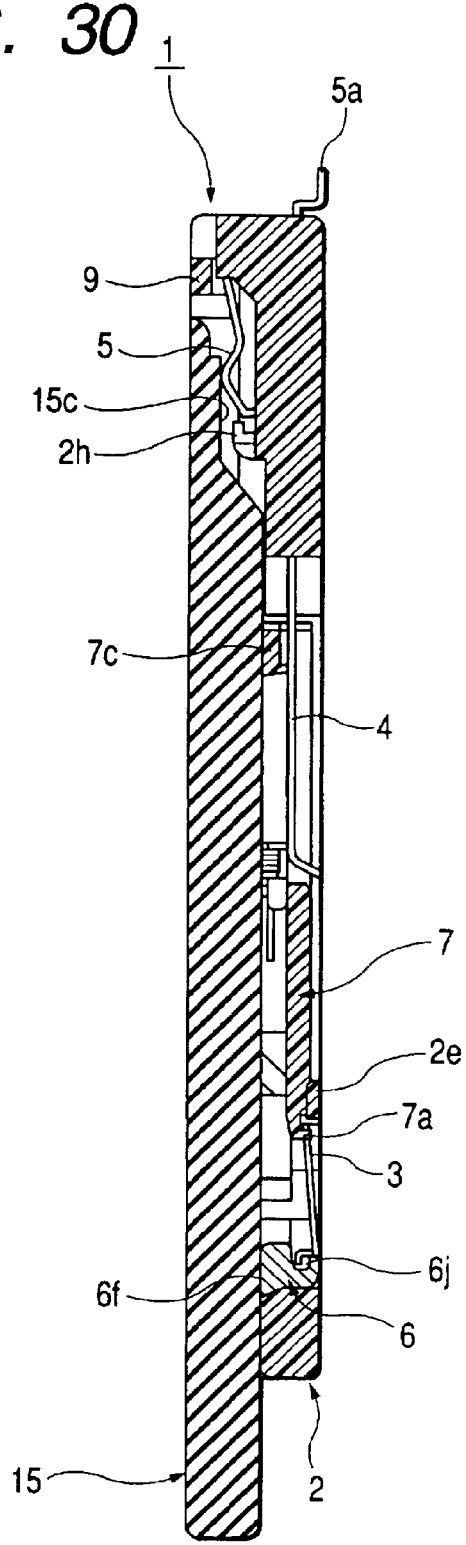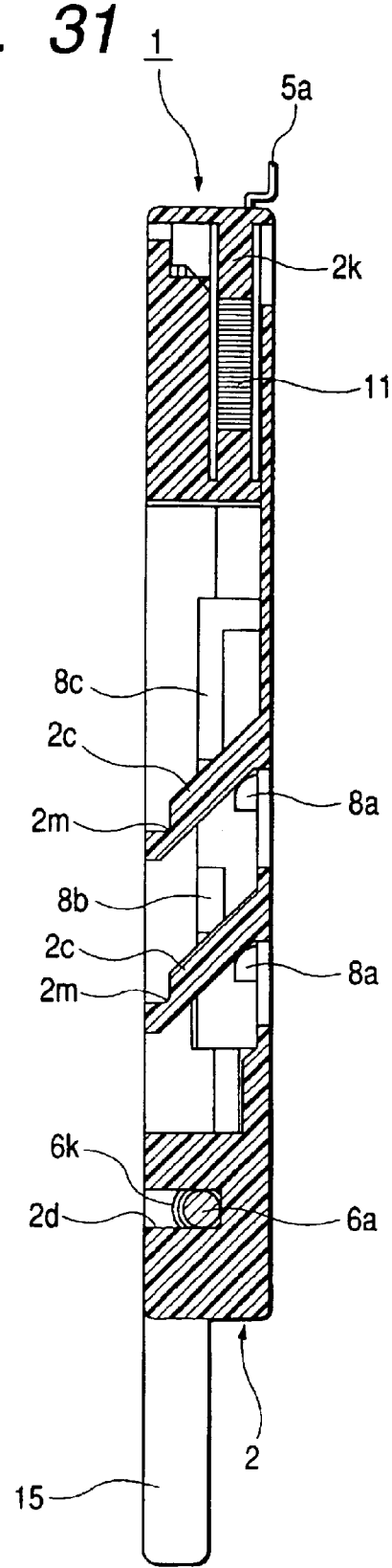

CONNECTOR DEVICE FOR CARD INTO WHICH PLURAL KINDS OF CARDS OF DIFFERENT SHAPES CAN BE INSERTED

BACKGROUND OF THE INVENTION

1. Field of the Invention

The present invention relates to a connector device for card, and more particularly to a connector device for card, which is capable of accommodating IC cards used as storage media of personal computers or the like, or memory cards used in electronic devices such as digital cameras.

2. Description of the Related Art

In general, as enlargement recording devices of electronic devices such as personal computers (hereinafter referred to as PCs) or digital cameras, connector devices for card have been used to write various information in or read that information from an IC (Integrated Circuit) cards with ICs embedded therein. As recording media of such conventional connector devices for card, small-sized cards such as PC cards or memory cards have been widely used.

The connector devices for card, which are capable of accommodating such small-sized cards, are configured to write required information in or read that information from the cards, but recently, various small-sized cards with different thicknesses or widths are being sold.

Referring to FIGS. 32 to 35 illustrating a conventional connector device for card in which a plurality of cards of different kinds can be inserted, the conventional connector device 50 for card is provided with a base substrate 56 formed with slots 53 and 55 into which a wide and thin card 51 and a narrow and thick card 52 can be inserted, respectively.

Upper and lower substrates 57 and 58 having a plurality of terminal members 59, 60 and 61 are fixedly arranged at the upper and lower sides of the base substrate 56, respectively. Any one of the plurality of terminal members 59, 60 and 61 remains contact with external contact portions 51a, 52a of cards 51 and 52 while applying an elastic force to the external contact portions.

In such a conventional connector device 50 for card, it is arranged that the wide and thin card 51 is guided to and mountable in the slot 53 and the narrow and thick card 52 is guided to and mountable in the slot 55.

[Patent Document]

Japanese Utility Model Registration No. 3079263

However, in the above-described conventional connector device 50 for card, in order to outwardly draw out the card 51 or the card 52 inserted into the slots 53 and 55, an operator has to grasp and pull an outwardly projected portion of the connector device 50 for card. Especially, there is a problem in that a small-size card is too difficult to draw out.

SUMMARY OF THE INVENTION

In consideration of the above problem, it is an object of the present invention to provide a connector device for card into which plural kinds of cards of different shapes can be inserted and from which the cards can be easily drawn out.

In order to achieve the above object, according to a first aspect of the present invention, a connector device for card comprises a housing, and a card insertion opening for inserting a wide and thick first card and a second narrow and thin card into the housing, wherein the housing is provided with a first ejection mechanism for ejecting the first card inserted into the housing and a second ejection mechanism for ejecting the second card, and the second ejection mechanism is movable to a position which does not interfere with the insertion of the first card when the first card is inserted.

According to a second aspect of the present invention, the second ejection mechanism is provided in an elevation member, which can ascend and descend in an upper and lower direction, and the elevation member descends in connection with the insertion of the first card.

According to a third aspect of the present invention, the first ejection mechanism includes a first sliding member slidable in connection with the first card inserted from the card opening, a first biasing member for biasing the first sliding member in an ejection direction opposite to the insertion direction of the first sliding member, and a first locking member for locking the first sliding member in a first card mounting position against the biasing force of the first biasing member, and the second ejection mechanism includes a second sliding member slidable in connection with the second card inserted from the card insertion opening, a second biasing member for biasing the second sliding member in an ejection direction of the second sliding member, and a second locking member for locking the second sliding member in a second card mounting position against the biasing force of the second biasing member.

According to a fourth aspect of the present-invention, the first card is formed to be longer than the second card, the housing is provided with a plurality of first terminal members inside the housing and a plurality of second terminal members in the front side close to the card insertion opening so as to correspond to a plurality of external contact portions formed in each of the first and second cards, the plurality of first terminal members capable of contacting the external contact portions of the first card, the plurality of second terminal members capable of contacting the external contact portions of the second card, and the second terminal member is pressed down to a position at which the second terminal member does not contact with the first card by the elevation member descended in connection with the insertion of the first card.

According to a fifth aspect of the present invention, the card insertion opening is provided with an elevation member holding mechanism held in a state where the elevation member can eject the second card, and, when the first card is inserted from the card insertion opening, the hold of the elevation member by the elevation member holding mechanism is released so that the elevation member can be ascended.

According to a sixth aspect of the present invention, the inclined wall inclined at a predetermined angle with respect to the insertion direction of the first and second cards is formed in the housing and guide projections slidable along the inclined wall are formed in the elevation member.

According to a seventh aspect of the present invention, a pair of the guide projections is formed with a predetermined gap therebetween and the elevation member can be elevated with the inclined wall inserted in the gap.

According to an eighth aspect of the present invention, a support portion capable of supporting the elevation member at an ascending position is formed in the inclined wall and the elevation member descends along the inclined wall as the support portion is pressed by the first card inserted in the card insertion opening, which releases the support by the support portion.

BRIEF DESCRIPTION OF THE DRAWINGS

FIG. 3 is a view illustrating a structure of a connector device for card-according to the present invention;

FIG. 4 is a view illustrating a structure of a connector device for card according to the present invention;

FIG. 7 is a view illustrating a housing according to the present invention;

FIG. 8 is a view illustrating a housing according to the present invention;

FIG. 22 is a view illustrating the mounting operation of the second card according to the present invention;

FIG. 23 is a view illustrating the mounting operation of the second card according to the present invention;

FIG. 30 is a view illustrating the mounting operation of the first card according to the present invention;

FIG. 31 is a view illustrating the mounting operation of the first card according to the present invention;

DESCRIPTION OF THE PREFERRED EMBODIMENTS

Now, a connector device for card according to preferred embodiments of the present invention will be described in detail with reference to FIGS. 1 to 31.

Figure 18A:
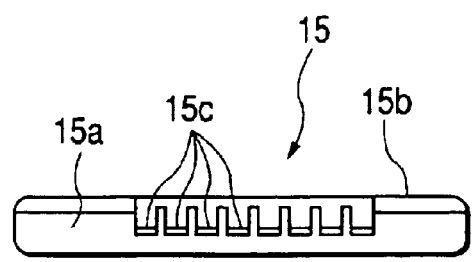
FIG. 18 is a view illustrating a first card according to the present invention.
Figure 18B:
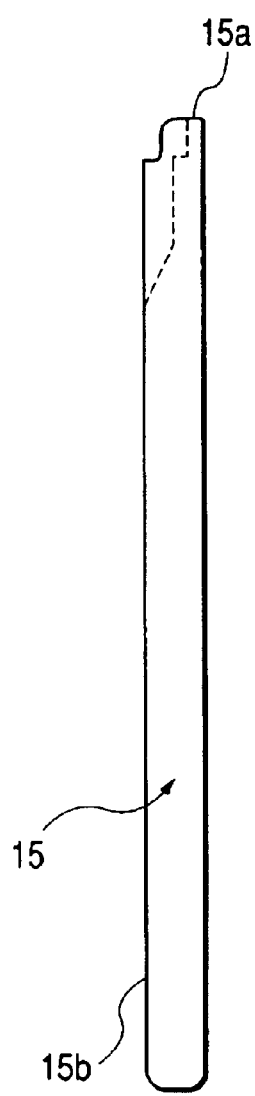
Figure 18C:
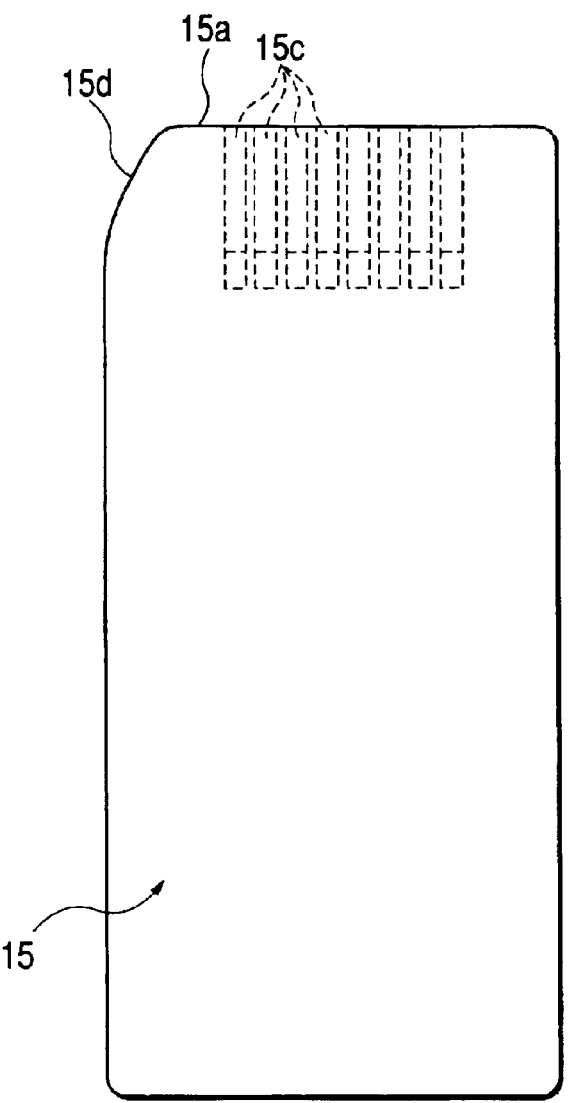
Figure 19A:
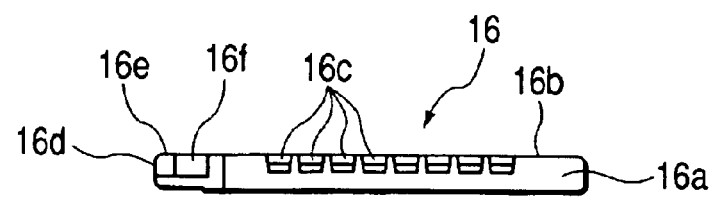
FIG. 19 is a view illustrating a second card according to the present invention.
Figure 19B:
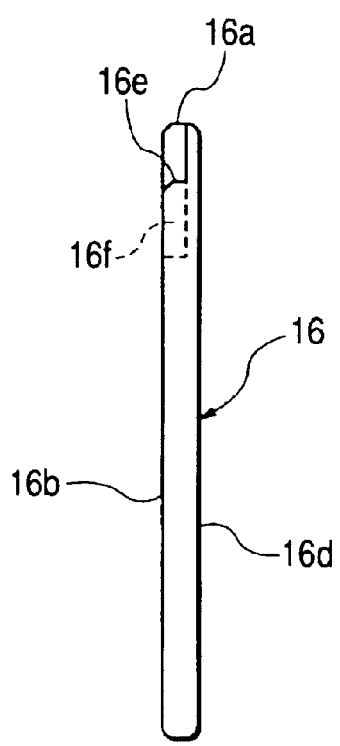

FIGS. 1 to 4 are views illustrating a structure of a connector device for card according to the present invention, FIGS. 5 to 8 are views illustrating a housing according to the present invention, FIGS. 9 to 12 are views illustrating a guide member according to the present invention, FIGS. 13 to 17 are views illustrating an elevation member according to the present invention, FIG. 18 is a view illustrating a first card according to the present invention, FIG. 19 is a view illustrating a second card according to the present invention, FIGS. 20 to 25 are views illustrating the mounting operation of the second card according to the present invention, and FIGS. 26 to 31 are views illustrating the mounting operation of the first card according to the present invention.

Figure 1:
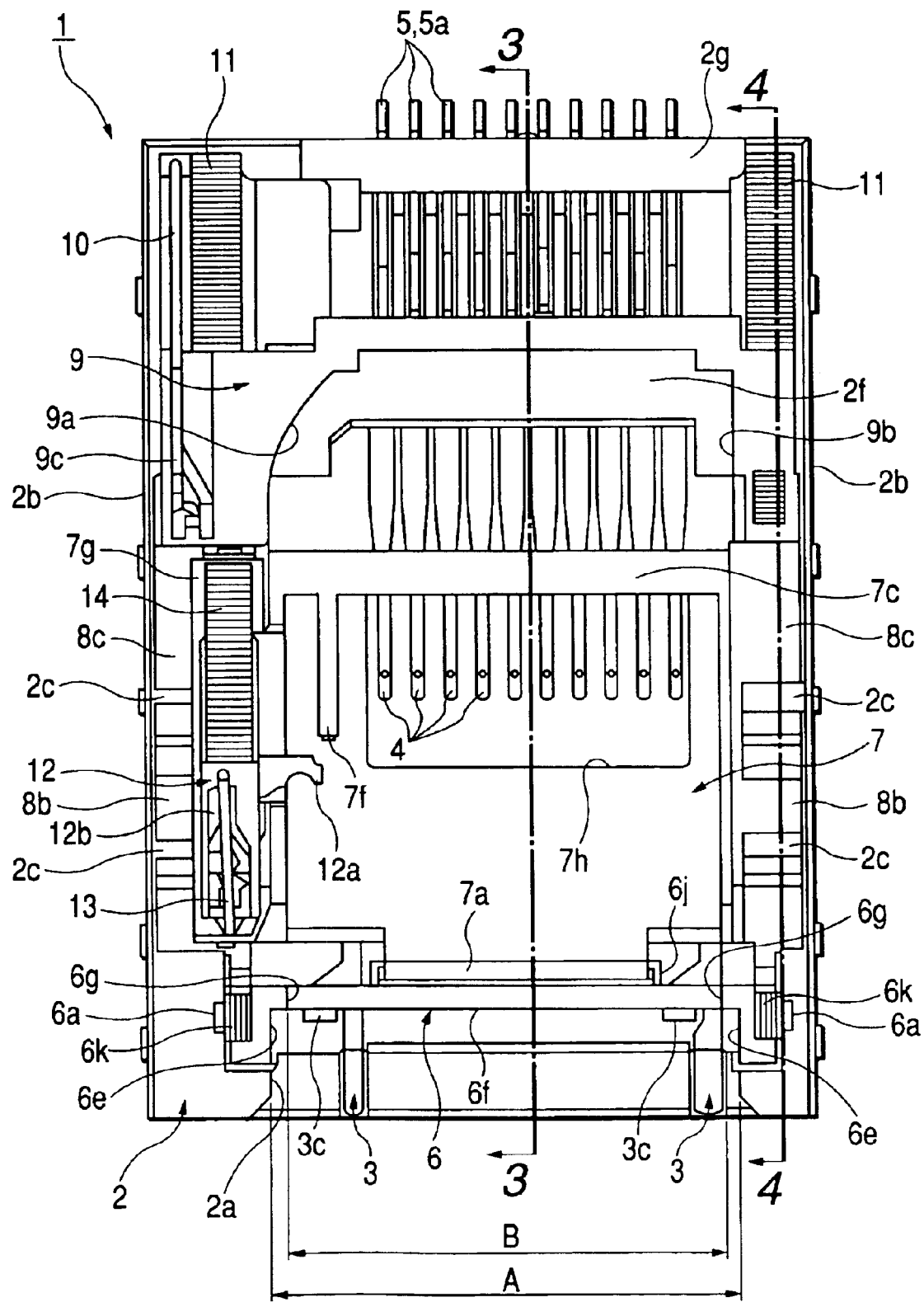
FIG. 1 is a view illustrating a structure of a connector device for card according to the present invention.

First, as shown in FIG. 1, a connector device 1 for card according to a first embodiment of the present invention includes a housing 2 constituting an appearance, which is made of an insulation material such as a resin material and is formed with nearly a rectangular shape.

Figure 5:
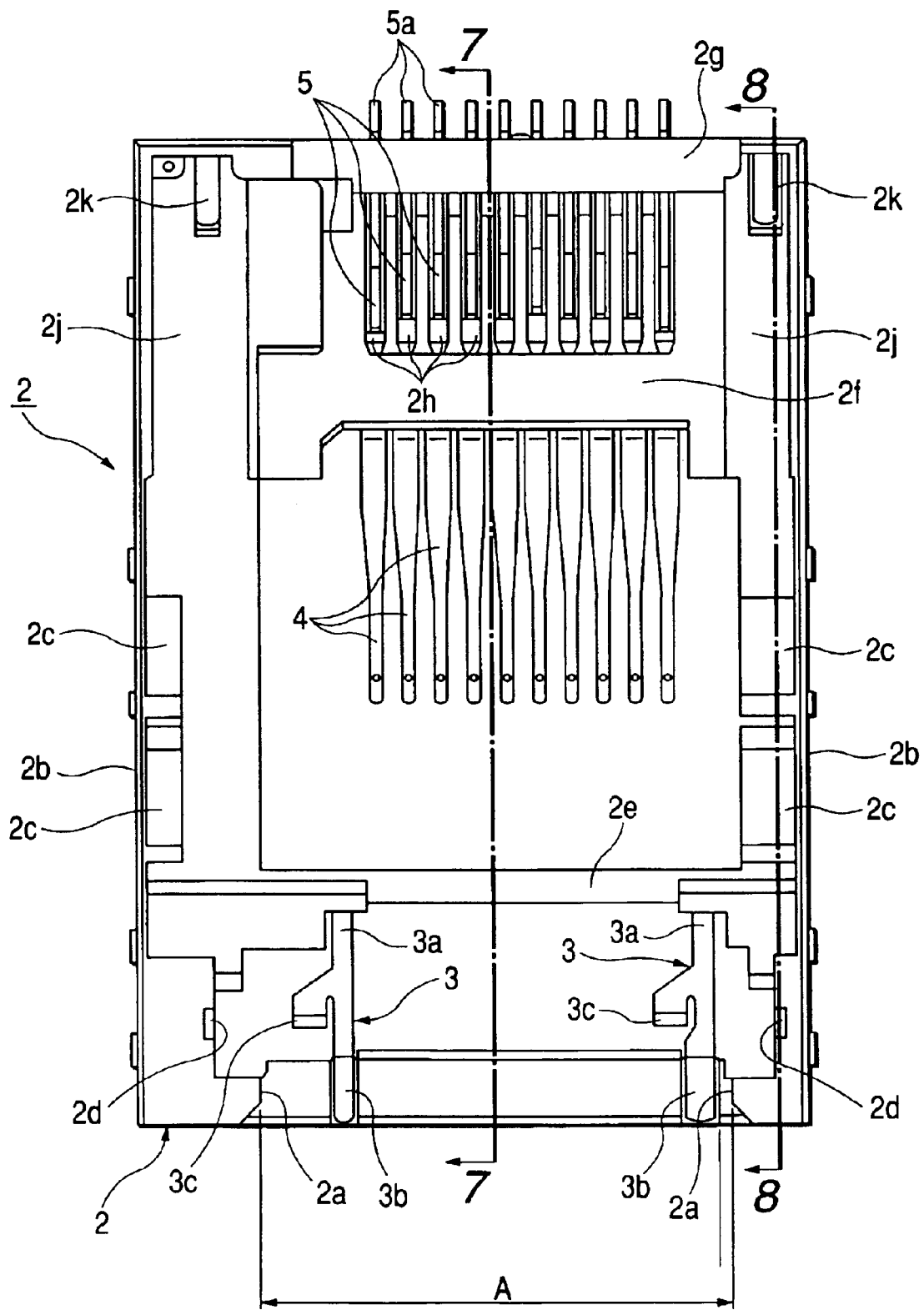
FIG. 5 is a view illustrating a housing according to the present invention.
Figure 6:
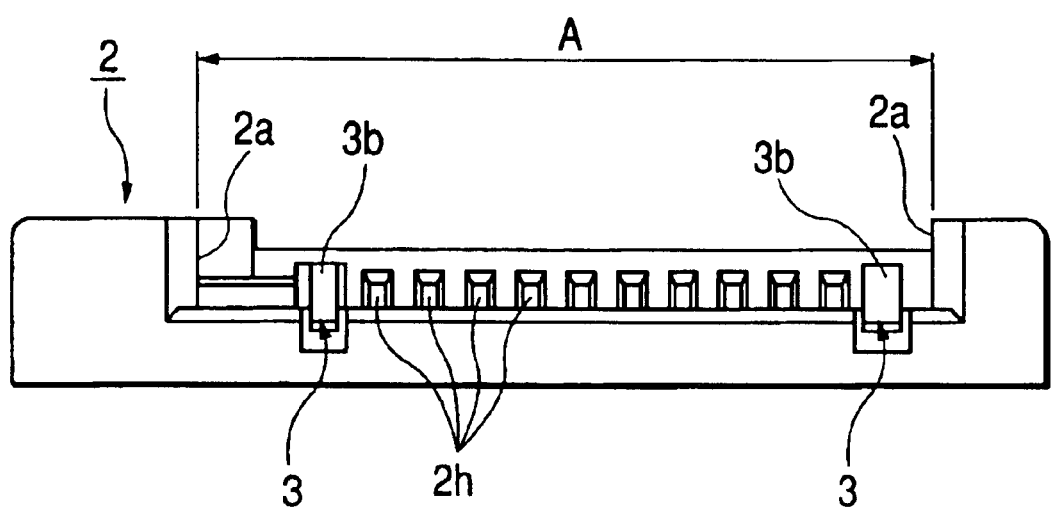
FIG. 6 is a view illustrating a housing according to the present invention.

As shown in FIGS. 5 and 6, a card insertion opening 2a having a width of A is formed in front of the housing 2. In addition, in side walls 2b and 2b at left and right outside of the housing 2, two inclined walls 2c inclined at a predetermined inclination angle with respect to an insertion direction of first and second cards 1.5 and 16, which will be described later, are formed at positions opposite to each other, respectively as shown in FIG. 8.

In addition, the left and right side walls 2b and 2b are widely formed near the card insertion opening 2a, where a support groove 2d for rotatably supporting a guide member 6 as an elevation member holding mechanism, which will be described later, is formed.

In addition, as shown in FIG. 8, the inclined walls 2c are formed with a stepped support portion 2m for supporting an elevation member 7, which will be described later, in a predetermined elevation position at an upper side of the housing 2 in the left side of the figure.

In addition, the card insertion opening 2a having the width of A is arranged with a pair of restriction members 3 formed by bending an elastic metal plate. As shown in FIG. 7, each of these restriction members 3 has a base portion 3a at its one end side, which is buried in a first crosspiece 2e of the housing 2 by an insert molding or the like and is cantilever-supported, and an end-free shaped guide portion 3b at its other end side, which is located at the card insertion opening 2a.

The guide portion 3b is bent into nearly a V-shape, projecting at a predetermined height from the bottom of the card insertion opening 2a, and can guide the height direction of the second card 16, which will be described later, inserted in the card insertion opening 2a.

In addition, the pair of restriction members 3 is provided with a rotation restriction portion 3c for restricting the rotation of the guide member 6 as the elevation member holding mechanism, which will be described later, between the base portion 3a and the guide portion 3b.

In addition, a plurality of second terminal members 4 made of an elastic metal plate is buried in a second crosspiece 2f at an inner side of the housing 2, enabling a contact with an external contact portion of the second card 16, which will be described later. In addition, a plurality of first terminal members 5 made of an elastic metal plate is buried in an inner wall 2g of the housing 2, with their terminal portions 5a projecting outside the housing 2.

In addition, as shown in FIGS. 7 and 8, the first terminal members 5 have leading end portions 5b to elastically contact with hooked terminal support portions 2h formed in the housing 2 so that movement of the first terminal members 5 above a predetermined height is restricted.

In addition, in the vicinity of the inner wall 2g of both of the left and right side walls 2b and 2b of the housing 2, a slide groove 2j at which the elevation member 7 and a first sliding member 9, which will be described later, are positioned is formed at a predetermined depth in an elongated shape, and rod-shaped spring support portions 2k and 2k project into the slide groove 2j from the inner wall 2g.

In addition, the guide member 6 as the elevation member holding mechanism for guiding the first and second card 15 and 16, which will be described later, inserted from the card insertion opening 2a is rotatably supported in the support groove 2d of the housing 2.

Figure 9:
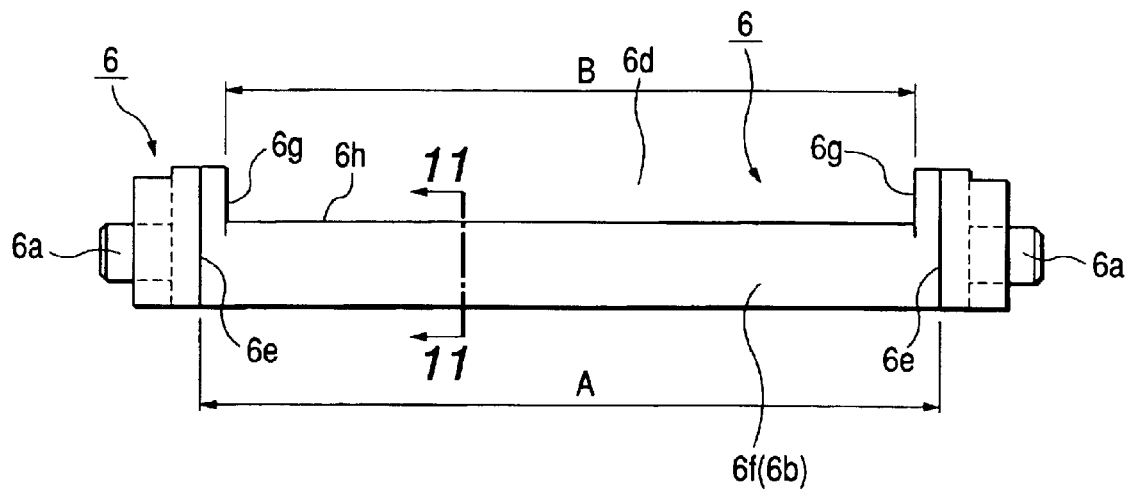
FIG. 9 is a view illustrating a guide member according to the present invention.
Figure 10:
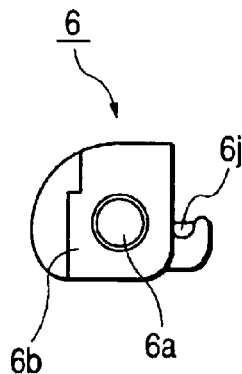
FIG. 10 is a view illustrating a guide member according to the present invention.

The guide member 6 will be now-described in more details with reference to FIGS. 9 to 12. As shown in FIG. 9, the guide member 6 is provided with support portions 6a and 6a having protruded shape at the left and right end portions, which are supportable in the support grooves 2d of the housing 2, and a card support 6b formed between the left and right support portions 6a and 6a. The card support 6b is provided with a first concave guide portion 6c of the width of A for guiding the first card 15, which will be described later, and a second concave guide portion 6d of the width of B for guiding the second card 16, which will be described later, on the side rotated at angle of 90° with respect to the first guide portion 6c.

The first guide portion 6c has a first wall 6f inserted between the first left and right side walls 6e and 6e and is formed with the width of A. In addition, the second guide portion 6d has a second wall 6h inserted between second left and right side walls 6g and 6g and is formed at the width of B. In addition, the first guide portion 6c of the width of A is formed at the same width as the card insertion opening 2a at the housing 2.

Figure 11:
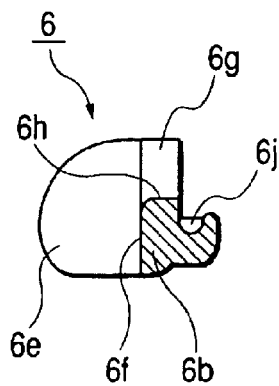
FIG. 11 is a view illustrating a guide member according to the present invention.
Figure 12:
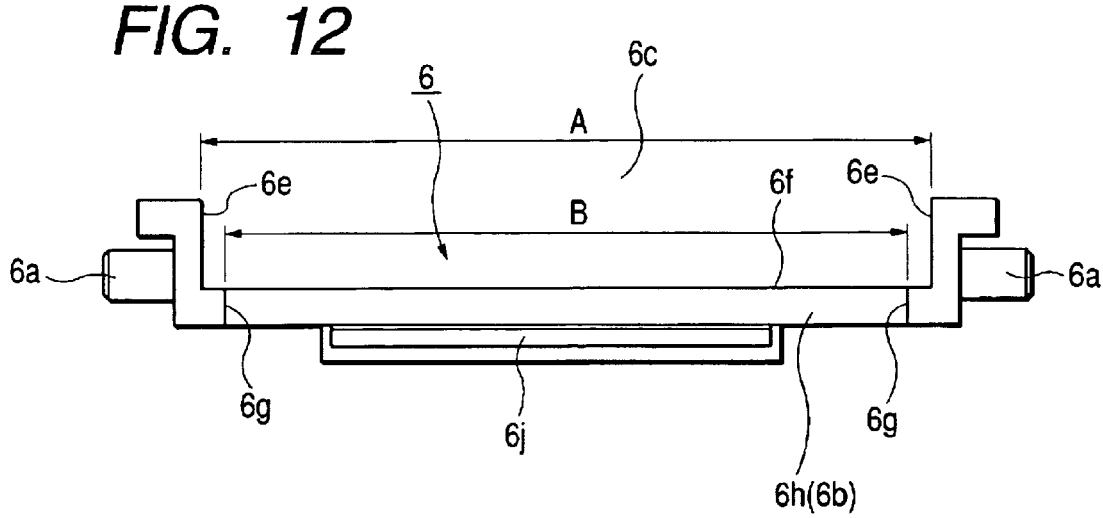
FIG. 12 is a view illustrating a guide member according to the present invention.

In addition, the first wall 6f and the second wall 6h of the card support 6b of the guide member 6 are formed perpendicular to each other as shown in FIG. 11. In addition, a grooved hold portion 6j for engaging and holding an engagement portion 7a of the elevation member 7, which will be described later, is formed at a side opposite to the first wall 6f in the back side of the card support 6b.

The support portion 6a of the guide member 6 as structured above is wound with a twist coil spring 6k and, in this state, is rotatably supported in the support groove 2d of the housing 2, as shown in FIG. 1.

In addition, the guide member 6 is applied with an elastic force in a counterclockwise direction around the support portion 6a by a biasing force of the twist coil spring 6k as shown in FIG. 3.

Figure 2:
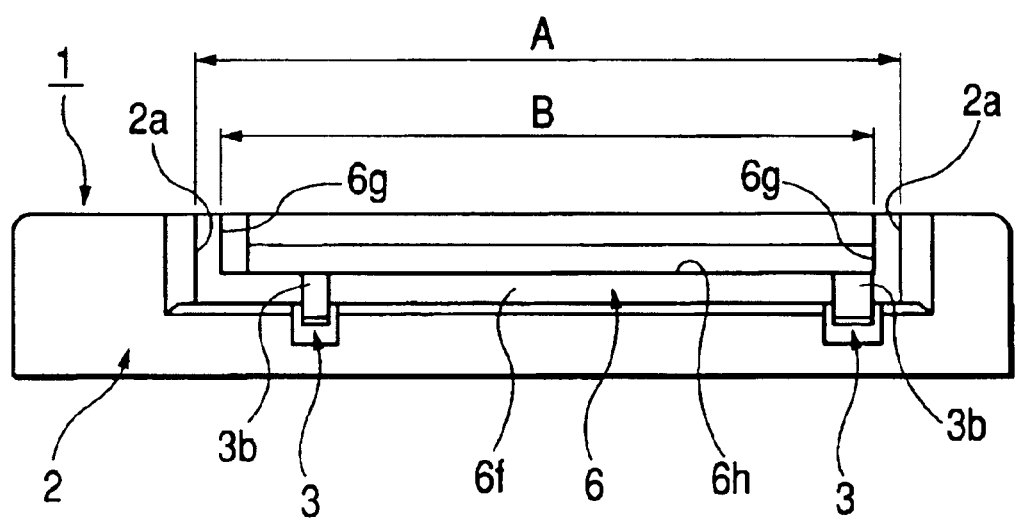
FIG. 2 is a view illustrating a structure of a connector device for card according to the present invention.

In addition, in an initial state before the first and second cards 15 and 16, which will be described later, are inserted, the guide member 6 takes a first posture of a state where the second guide portion 6d of the width of B is positioned in the card insertion opening 2a and keeps a state where a rotation in a clockwise direction is possible but a rotation in a counterclockwise direction is restricted, as shown in FIGS. 1, 2 and 3.

In addition, in the initial state, the first wall 6f of the card support 6b in the guide member 6 taking the first posture contacts with the rotation restriction portion 3c of the restriction member 3 such that the guide member 6 is not rotated in the clockwise direction, as shown in FIG. 3.

In addition, when the guide member 6 in the first posture inserts the first card 15, which will be described later, from the card insertion opening 2a, the guide portion 3b of the restriction member 3 is pressed down so that a rotation restriction in the clockwise direction by the rotation restriction portion 3c is released.

In addition, the guide member 6 is pressed by the inserted first card 15 such that it changes from the first posture to a second posture by being rotated in the clockwise direction by 90 degree.

As the first guide portion 6c of the guide member 6 taking the second posture is positioned in the card insertion opening 2a, the guide member 6 can guide the first card 15, which will be described later, inserted from the card insertion opening 2a.

In addition, as shown in FIG. 3, the elevation member 7 engages with the hold portion 6j of the guide member 6 taking the first posture and is supported at an ascending position. The elevation member 7 is made of a resin material, for example, and is formed into a nearly rectangular shape, as shown in FIGS. 13 to 17.

Figure 13:
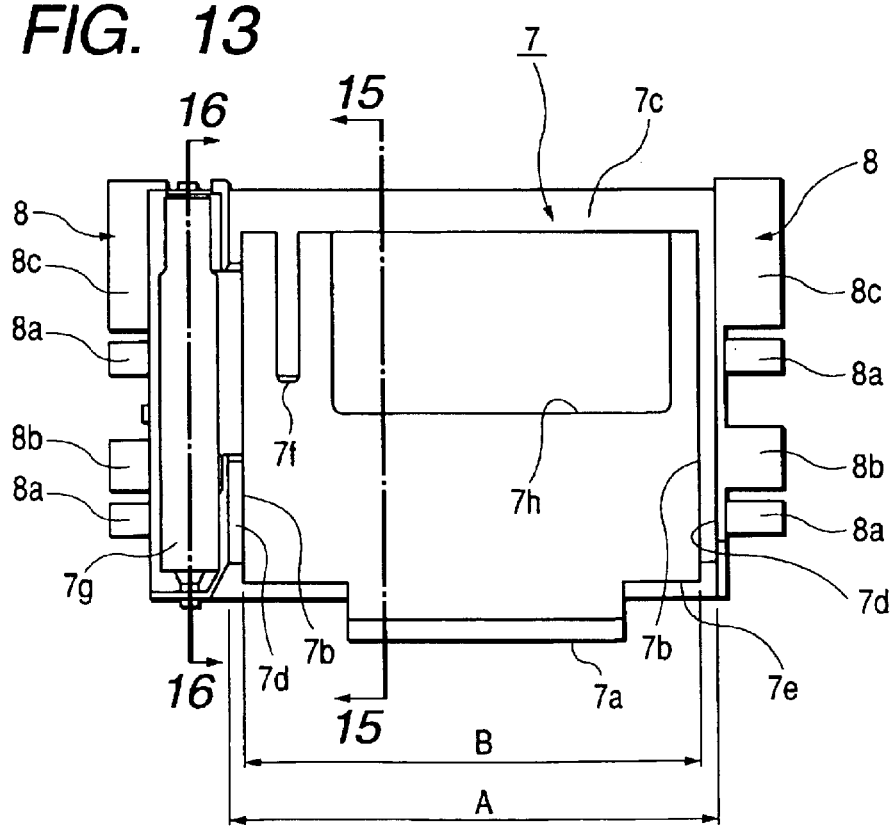
FIG. 13 is a view illustrating an elevation member according to the present invention.
Figure 14:
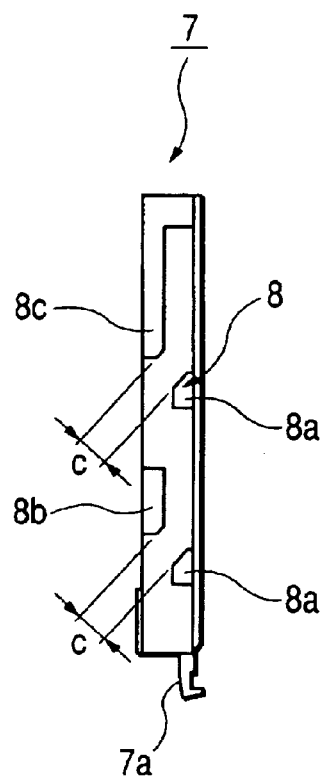
FIG. 14 is a view illustrating an elevation member according to the present invention.
Figure 15:
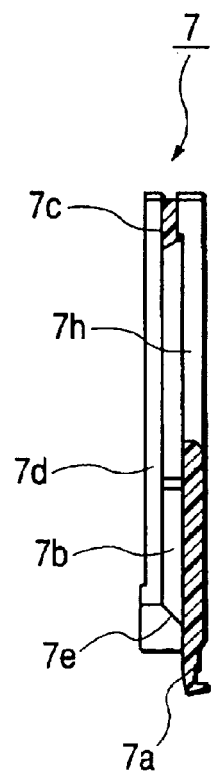
FIG. 15 is a view illustrating an elevation member according to the present invention.
Figure 16:
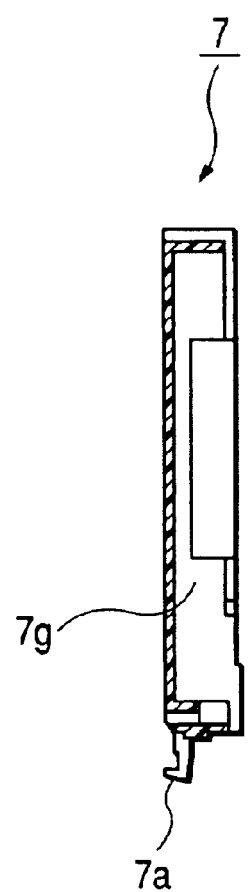
FIG. 16 is a view illustrating an elevation member according to the present invention.
Figure 17:
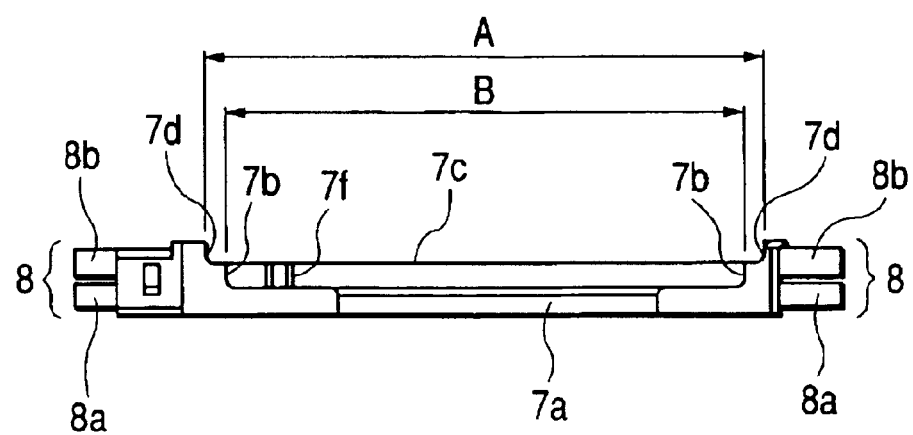
FIG. 17 is a view illustrating an elevation member according to the present invention.

As shown in FIGS. 13 to 15, the elevation member 7 has the hooked engagement portion 7a projected downwardly. This engagement portion 7a can engage with the hold portion 6j of the guide member 6, as shown in FIG. 3.

In addition, the second card guide portion 7b of the same width B as the second guide portion 6d of the guide member 6 is formed at a predetermined depth in the elevation member 7. A card contact wall 7c with which the second card 16, which will be described later, guided to and inserted in the second card guide portion 7b can contact is formed at an inner side of the second card guide portion 7b.

In addition, the first card guide portion 7d of the same width A as the first guide portion 6c of the guide member 6 is formed thinner than the second card guide portion 7b at an outer side of the second card guide portion 7b and is formed extending from the front side to the card contact wall 7c.

In addition, a tapered surface 7e is formed at the front portion where the first and second card guide portions 7d and 7b are formed. The first card 15, which will be described later, passed through and inserted in the guide member 6 presses down the tapered surface 7e such that the elevation member 7 at the ascending position descends to a predetermined descending position.

In addition, as shown in FIG. 13, the elevation member 7 is provided with an erroneous insertion prevention portion 7f projecting downwardly by a predetermined length shown from a position near the left side of the card contact wall 7c, so that a possible erroneous insertion of the second card 16 can be detected by an operator.

In addition, the elevation member 7 shown in FIG. 13 is formed with an elongated slide receiving portion 7g of a predetermined width on the left side of the first card guide portion 7d of the width of A. The second sliding member 12, which will be described later, is received in the slide receiving portion 7g and is positioned slidably upward and downward.

In addition, an opening 7h of a predetermined size is formed in a rectangular shape in contact with the card contact wall 7c. The plurality of second terminal members 4 is positioned in the opening.

In addition, slidable guide projections 8 project along the inclined wall 2c at the left and right end surfaces of the elevation member 7 shown in FIG. 13.

The guide projections 8 have a pair of projecting portions 8a and 8b formed in the front and back sides, respectively, which are opposite to each other in a slant direction with a predetermined gap having a dimension of C between them, as shown in FIG. 14.

In addition, the guide projections 8 can ascend and descend along the inclined wall 2c with the inclined wall 2c inserted in the gap of the dimension of C.

As shown in FIG. 3, when the guide member 6 is in the first posture, the engagement portion 7a of the elevation member 7 engages with the hold portion 6j of the guide member 6. In addition, a lower side of the card contact wall 7c is pressed up to the plurality of second terminal member 4 and each of the projecting portions 8b and 8c of the guide projections 8 is positioned at the support portion 2m and is supported in an ascending position. When the first card 15, which will be described later, is inserted and the guide member 6 is rotated into the second posture, the engagement of the engagement portion 7a, which engaged with the guide member 6, of the elevation member 7 in the ascending position is released. In addition, the projecting portions 8b and 8c are released from the support portion 2m and are descended to a predetermined fall position along the inclined wall 2c of the housing 2.

Namely, the elevation member 7 can be elevated in a direction of attachment to and detachment from the back sides 15b and 16b of the inserted first or second card 15 and 16.

In addition, the first sliding member 9 having the guide portions 9a and 9b, each of which has a nearly ⊐ shape when viewed from the above, is slidably supported and arranged in an upward and downward direction in the left and right slide grooves 2j and 2j inside the housing 2, as shown in FIG. 1.

In addition, the first sliding member 9 has a cam groove 9c at the vicinity of a left end portion. When the first sliding member 9 slides in connection with the sliding of the inserted first card 15, one end portion of a first slide pin 10 as a first locking member, with another end portion of the first slide pin 10 supported at the housing 2, can slide into the cam groove 9c.

The first sliding member 9 guides a front end portion 15a of the first card 15, which will be described later, inserted in the guide portions 9a and 9b, and also slides to the inner wall 2g of the housing 2 by being pressed by the first card 15, such that the first card 15 can be mounted in a first card mounting position.

In addition, since the guide portions 9a and 9b of the first sliding member 9 have different shapes from each other, the erroneous insertion of the first card 15 can be prevented.

In addition, when the first card 15, which will be described later, inserted from the card insertion opening 2a is positioned in the first card mounting position, one end portion of the first slide pin 10 as the first locking member engages with a lock portion (not shown) within the cam groove 9c.

In addition, the first card 15 is positioned in the first card mounting position such that the movement of the first sliding member 9 is locked.

In addition, the connector device 1 for card of the present invention has the first ejection mechanism for ejecting the first card 15 from the first card mounting position as the lock of the first sliding member 9 is released by inwardly pressing the first card 15 mounted in the first card mounting position again by a predetermined amount (push/push operation) after the first sliding member 9 is locked by the first slide pin 10 as the first locking member.

The first ejection mechanism has the cam groove 9c at the vicinity of the left end portion of the first sliding member 9 as shown in FIG. 1. When the first sliding member 9 slides in connection with the sliding of the inserted first card 15, one end portion of the first slide pin 10 as the first locking member, with another end portion of the first slide pin 10 supported at the housing 2, slides into the cam groove 9c.

In addition, when the first card 15, which will be described later, inserted from the card insertion opening 2a is positioned in the first card mounting position, one end portion of the first slide pin 10 as the first locking member engages with a lock portion (not shown) within the cam groove 9c such that the movement of the first sliding member 9 in the first card mounting position is locked.

In addition, the first sliding member 9 is applied with an elastic force by a first biasing member 11 composed of a coil spring supported to the spring support portion 2k of the housing 2. Accordingly, after the first sliding member 9 is locked, when the lock of the first sliding member 9 is released by push/push operating the first card 15 in the first card mounting position, the first card 15 can be ejected to a predetermined ejection position by a biasing force of the first biasing member 11.

Namely, the first ejection mechanism according to the present invention comprises the first sliding member 9 slidable in connection with the sliding of the first card 15 inserted from the card insertion opening 2a, the first biasing member 11 for biasing the first sliding member 9 in an ejection direction, and the first locking member (the first slide pin 10) for locking the first sliding member 9 in the first card mounting position.

In addition, in the slide receiving portion 7g of the elevation member 7, a second sliding member 12 as shown in FIG. 1 is accommodated so that it can slide along the slide receiving portion 7g.

The second sliding member 12 is provided with a card guide portion 12a that is capable of contacting a contact portion 16e of the second card 16, which will be described later, and a cam groove 12b for locking the movement of the second sliding member 12.

In addition, when the second sliding member 12 slides, one end portion of a second slide pin 13 as a second locking member, with another end portion of the second slide pin 13 supported at the elevation member 7, can slide into the cam groove 12b.

In addition, when the second card 16, which will be described later, is positioned in the second card mounting position, one end portion of the second slide pin 13 as the second locking member engages with a lock portion (not shown) within the cam groove 12b such that the second sliding member 12 is locked.

In addition, the connector device 1 for card of the present invention has the second ejection mechanism for ejecting the second card 16 from the second card mounting position as the lock of the second sliding member 12 is released by inwardly pressing the second card 16 mounted in the second card mounting position again by a predetermined amount (push/push operation) after the second sliding member 12 is locked by the second slide pin 13 as the second locking member.

The second ejection mechanism has the cam groove 12b in the second sliding member 12 as shown in FIG. 1. When the second sliding member 12 slides in connection with the sliding of the inserted second card 16, one end portion of the second slide pin 13 as the second locking member, with another end portion of the second slide pin 13 supported at the elevation member 7, slides into the cam groove 12b.

In addition, when the second card 16, which will be described later, inserted from the card insertion opening 2a is positioned in the second card mounting position, one end portion of the second slide pin 13 as the second locking member engages with a lock portion (not shown) within the cam groove 12b such that the movement of the second sliding member 12 in the second card mounting position is locked.

In addition, the second sliding member 12 is applied with an elastic force by a second biasing member 14 composed of a coil spring supported in the slide receiving portion 7g of the second sliding member 12. Accordingly, after the second sliding member 12 is locked, when the lock of the second sliding member 12 is released by push/push operating the second card 16 in the second card mounting position, the second card 16 can be ejected to a predetermined ejection position by a biasing force of the second biasing member 14.

Namely, the second ejection mechanism according to the present invention comprises the second sliding member 12 slidable in connection with the sliding of the second card 16 inserted from the card insertion opening 2a, the second biasing member 14 for biasing the second sliding member 12 in an ejection direction, and the second locking member (the second slide pin 13) for locking the second sliding member 12 in the second card mounting position.

In the connector device 1 for card of the present invention as structured above, the upper side of the housing 2 is closed by a cover member (not shown) and the upper side of the first and second cards 15 and 16 inserted into the connector device 1 for card are guided.

In addition, as shown in FIG. 18, the first card 15 is formed wider, thicker, and longer than the second card 16, which will be described later.

The first card 15 is formed such that a plurality of external contact portions 15c that is capable of contacting the first terminal member 5 are exposed and arranged in the back side 15b at the front end portion 15a of the first card 15.

In addition, the front end portion 15a is asymmetrically formed as one corner portion 15d of the front end portion 15a is cut into an arc shape. Accordingly, even if the first card 15 is inversely inserted into the first sliding member 9, such inverse insertion can be detected.

In addition, as shown in FIG. 19, the second card 16 is formed narrower, thinner, and shorter than the first card 15.

The second card 16 is formed such that a plurality of external contact portions 16c that is capable of contacting the second terminal member 4 are exposed and arranged in the back side 16b at the front end portion 16a of the second card 16.

Figure 19C:
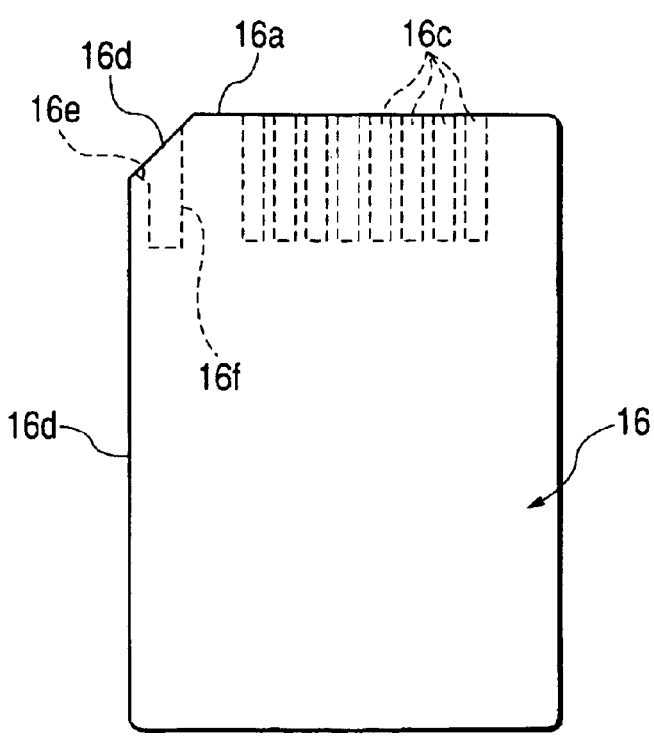
Figure 20:
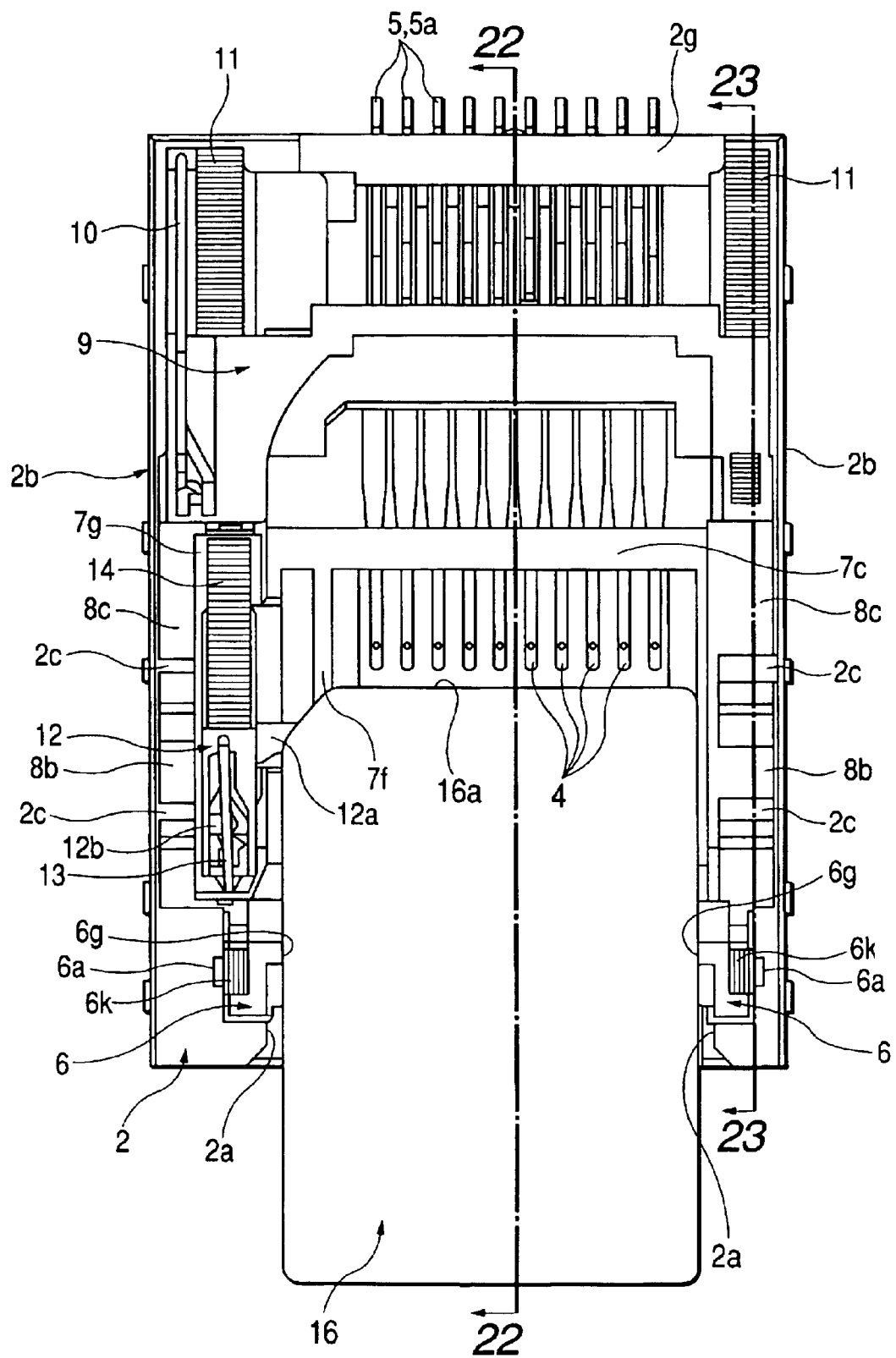
FIG. 20 is a view illustrating the mounting operation of the second card according to the present invention.
Figure 21:
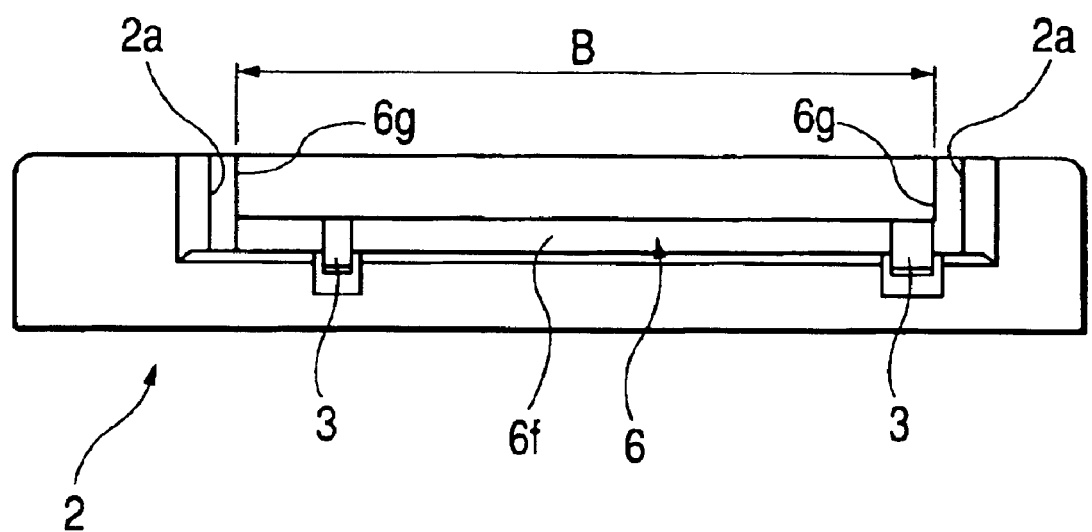
FIG. 21 is a view illustrating the mounting operation of the second card according to the present invention.

In addition, in one corner portion 16d in the left of the front end portion 16a as shown in FIG. 19C, a contact portion 16e that is capable of contacting the card guide portion 12a of the second sliding member 12 and a groove portion 16f for engaging with the erroneous insertion prevention portion 7f of the second sliding member 12 are formed at a predetermined depth and width.

Namely, since the groove portion 16f is formed in a position corresponding to the erroneous insertion prevention portion 7f in the second sliding member 12, the inverse insertion of the second card 16 can be prevented. The guide member 6 in the initial state before the first and second cards 15 and 16 are inserted into the card insertion opening 2a of the housing 2 takes the first posture where the second guide portion 6d is positioned in the card insertion opening 2a, as shown in FIG. 2.

In the connector device 1 for card of the present invention as structured above, in the initial state where the guide member 6 is in the first posture, the elevation member 7 is in the ascending position as shown in FIG. 23, the engagement portion 7a engages with the hold portion 6j of the guide member 6, the card contact wall 7c is pressed up to the plurality of second terminal members 4, and the projecting portions 8b and 8c are supported in the support portion 2m of the inclined wall 2c.

Now, the operation for mounting the second card 16 in the connector device 1 for card in the initial state will be described with reference to FIGS. 20 to 25. First, the front end portion 16a of the second card 16 is inserted into the card insertion opening 2a of the housing 2.

Then, the front end portion 16a is guided to the second guide portion 6d having the dimension of B of the guide member 6 in the first posture and enters into the housing 2.

At this time, the second card 16 presses the second sliding member 12 as the contact portion 16e in one corner portion 16d contacts the card guide portion 12a of the second sliding member 12, and the second sliding member 12 slides to the card contact wall 7c of the elevation member 7.

Accordingly, the width direction of the front end portion 16a of the second card 16 is guided to the second card guide portion 7b of the width of B of the elevation member 7 in the ascending position and the erroneous insertion prevention portion 7f of the elevation member 7 enters into the groove portion 16f.

Figure 24:
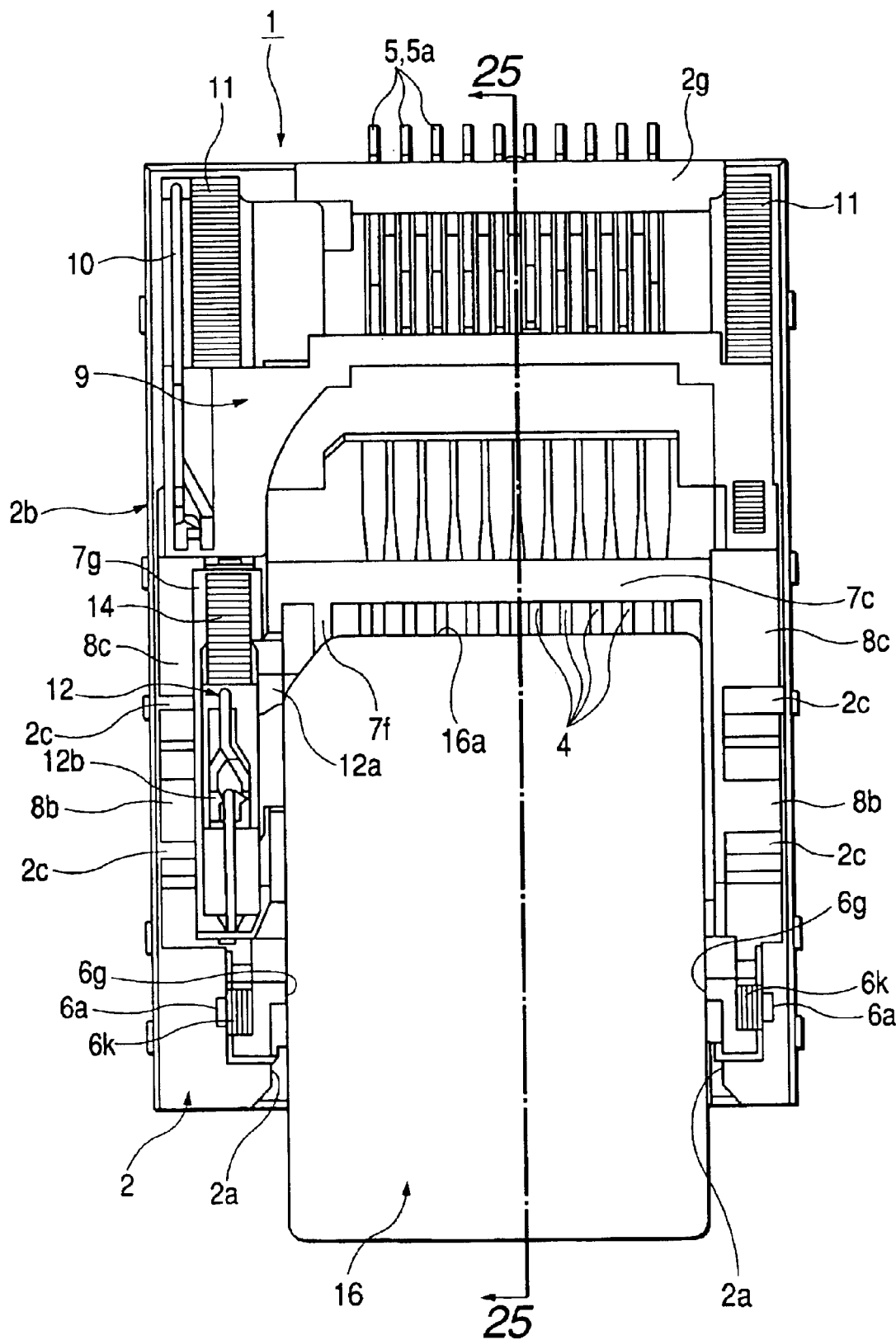
FIG. 24 is a view illustrating the mounting operation of the second card according to the present invention.
Figure 25:
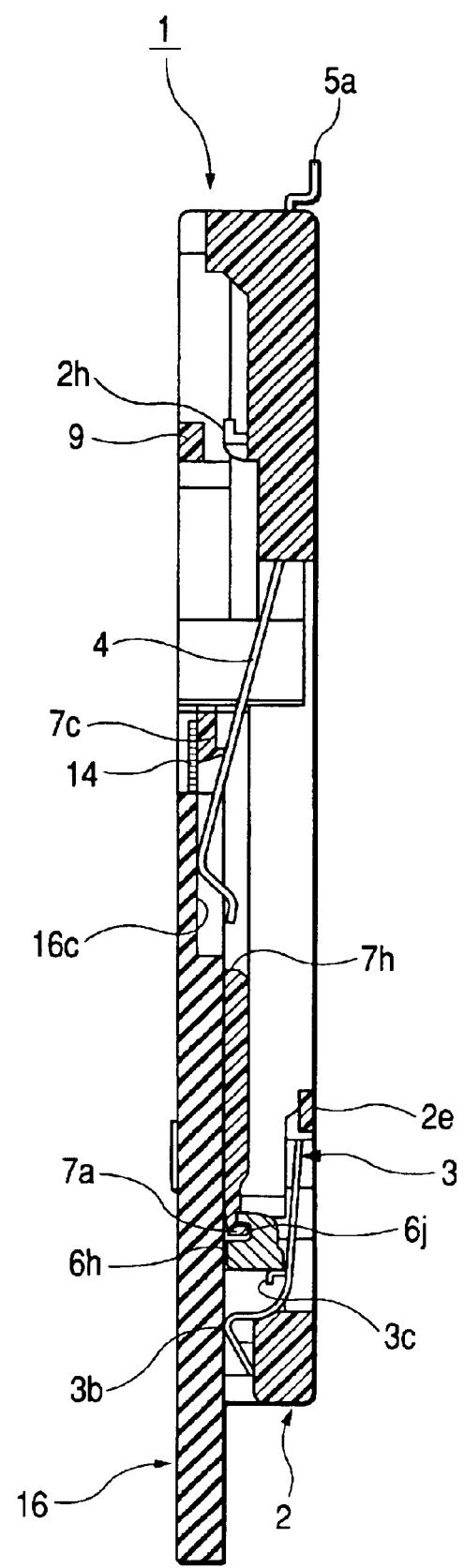
FIG. 25 is a view illustrating the mounting operation of the second card according to the present invention.

Then, as shown in FIGS. 22 and 24, when the second card 16 is positioned in the second card mounting position and the external contact portion 16c contacts the second terminal member 4, the movement of the second sliding member 12 is locked by the second slide pin 13 positioned in the cam groove 12b. As the second card 16 is positioned in the second card mounting position, information can be written in or read from the second card through the second terminal member 4.

In addition, in order to eject the second card 16 positioned in the second card mounting position, the second card 16 is inwardly pressed by a predetermined amount (push/push operation). Then, the lock of the second sliding member 12 by the second slide pin 13 as the second locking member is released, the second sliding member 12 is pressed to the card insertion opening 2a by the biasing force of the second biasing member 14, and also the second card 16 in the second card mounting position is ejected to a position shown in FIG. 20.

Then, an operator can take out the second card 16 outwardly ejected by the predetermined amount from the card insertion opening 2a. At this time, since the second card 16 is released from pressure contact of the plurality of second terminal members 4, it can be took out by a small force.

Next, the operation for mounting the first card 15 in the connector device 1 for card of the present invention where the guide member 6 is in the first posture will be described with reference to FIGS. 26 to 31. First, when the guide member 6 inserts the first card 15 into the card insertion opening 2a in the first posture, the front end portion 15a of the first card 15 presses the first wall 6f of the guide member 6.

Accordingly, the guide member 6 is rotated in the clockwise direction with the support portion 6a as a fulcrum such that the engagement of the hold portion 6j with the engagement portion 7a is released, and the first guide portion 6c of the width of A can guide the width direction of the first card 15 positioned and inserted in the card insertion opening 2a.

Then, when the first card 15 guided to the first guide portion 6c is further pressed inside the housing 2, the front end portion 15a of the first card 15 presses the tapered surface 7e of the elevation member 7 and slides the elevation member 7 inside the housing 2 by a predetermined amount.

Then, the projecting portions 8b and 8c of the elevation member 7 deviates from the support portion 2m of the inclined wall 2c and the elevation member 7 having the second ejection mechanism descends along the inclined wall 2c, as shown in FIG. 31.

Namely, when the second ejection mechanism inserts the first card 15, it can move to a position in which the insertion of the first card 15 is not prevented.

In addition, as the elevation member 7 descends, the first card 15 is guided to the first card guide portion 7d of the width of A of the elevation member 7 and enters into the housing 2, passing over the card contact wall 7c of the elevation member 7. In addition, the front end portion 15a is guided to the guide portions 9a and 9b of one direction and the other direction of the first sliding member 9.

Then, when the first card 15 is pressed inwardly, the first sliding member 9 is inwardly slid against a biasing force of the first biasing member 11. Accordingly, the external contact portion 15c of the first card 15 contacts the first terminal member 5.

Figure 29:
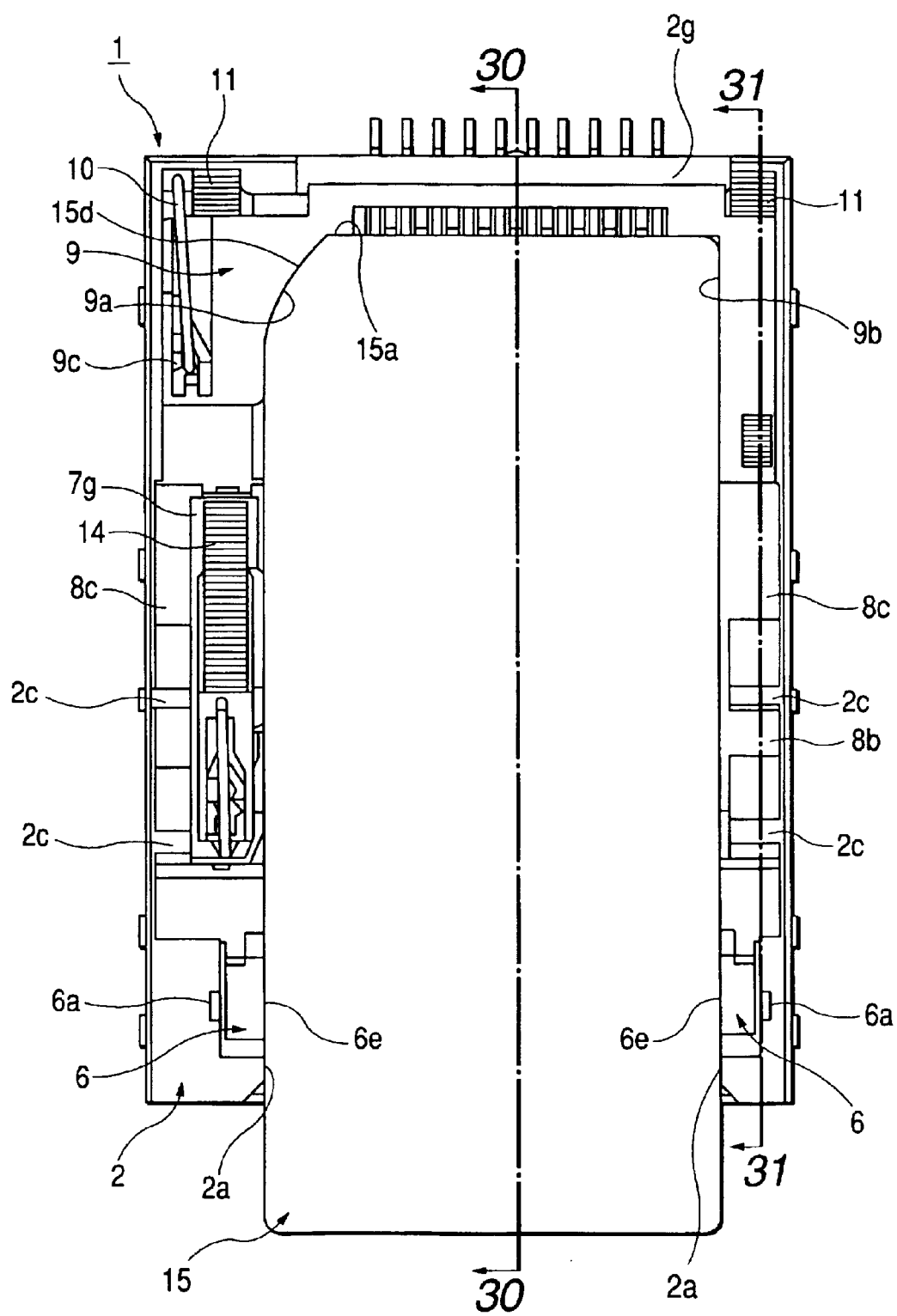
FIG. 29 is a view illustrating the mounting operation of the first card according to the present invention.
Figure 32:
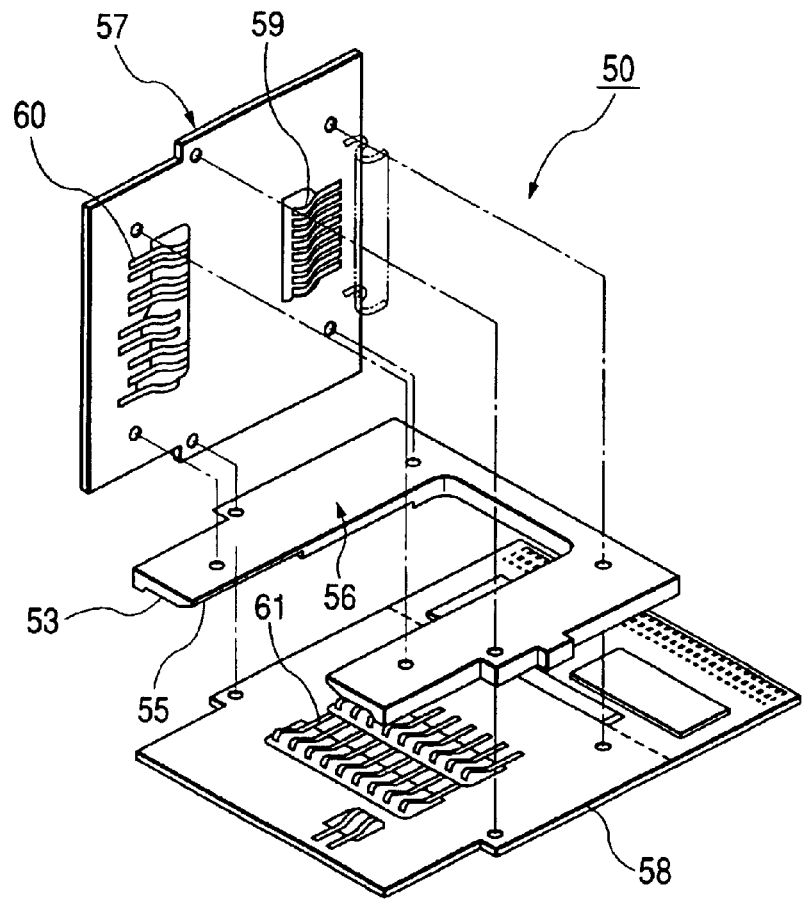
FIG. 32 is a view illustrating a conventional connector device for card.
Figure 33:
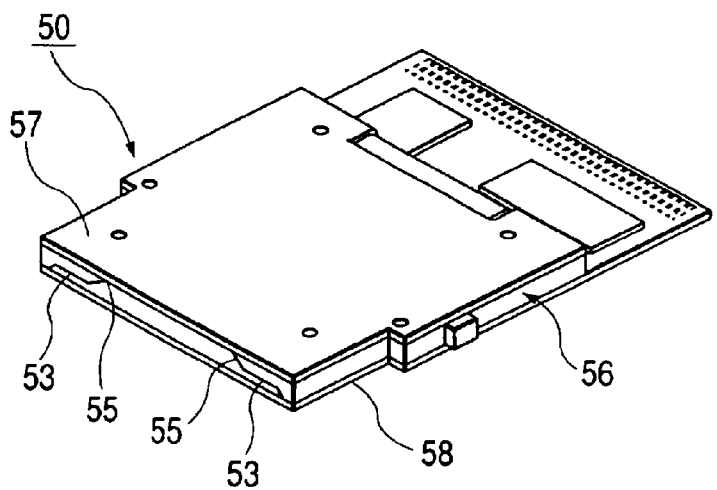
FIG. 33 is a view illustrating a conventional connector device for card.
Figure 34:
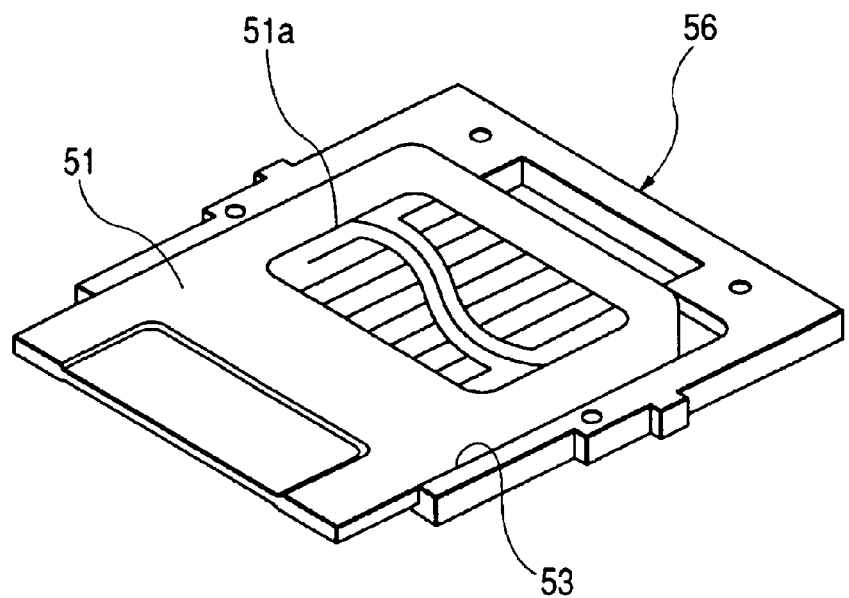
FIG. 34 is a view illustrating a conventional connector device for card.
Figure 35:
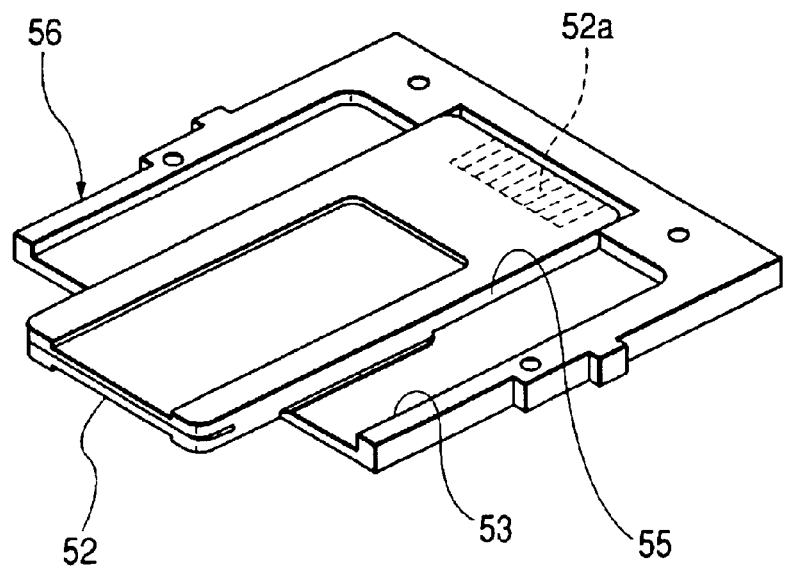
FIG. 35 is a view illustrating a conventional connector device for card.

Simultaneously, the movement of the first sliding member 9 is locked in the lock portion (not shown) formed in the cam groove 9c of the first sliding member 9 by the first slide pin 10 as the first locking member. Then, the first card 15 is positioned in the first card mounting position as shown in FIGS. 29 and 30.

As the first card 15 is positioned in the first card mounting position, information can be written in or read from the first card 15 through the first terminal member 5.

Figure 26:
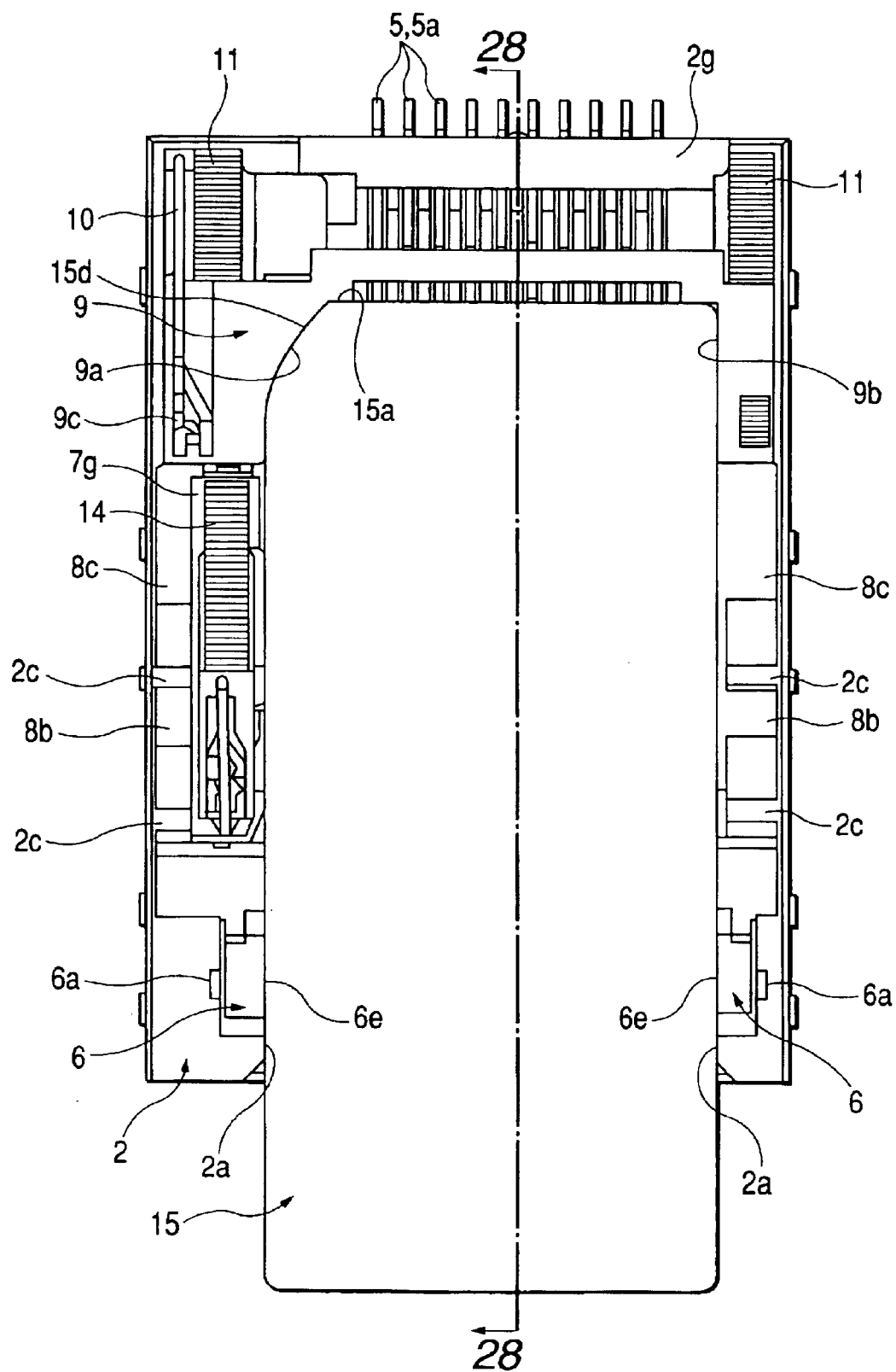
FIG. 26 is a view illustrating the mounting operation of the first card according to the present invention.
Figure 27:
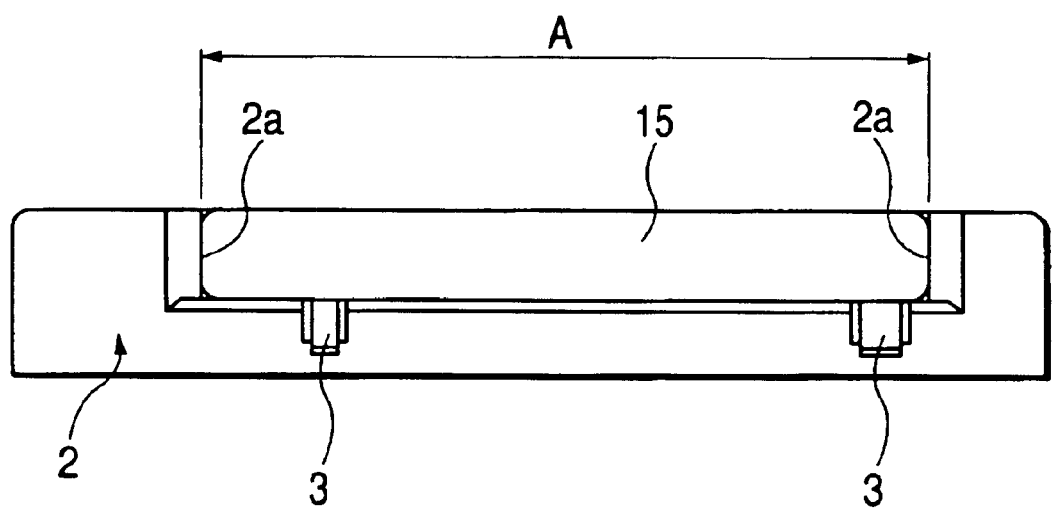
FIG. 27 is a view illustrating the mounting operation of the first card according to the present invention.
Figure 28:
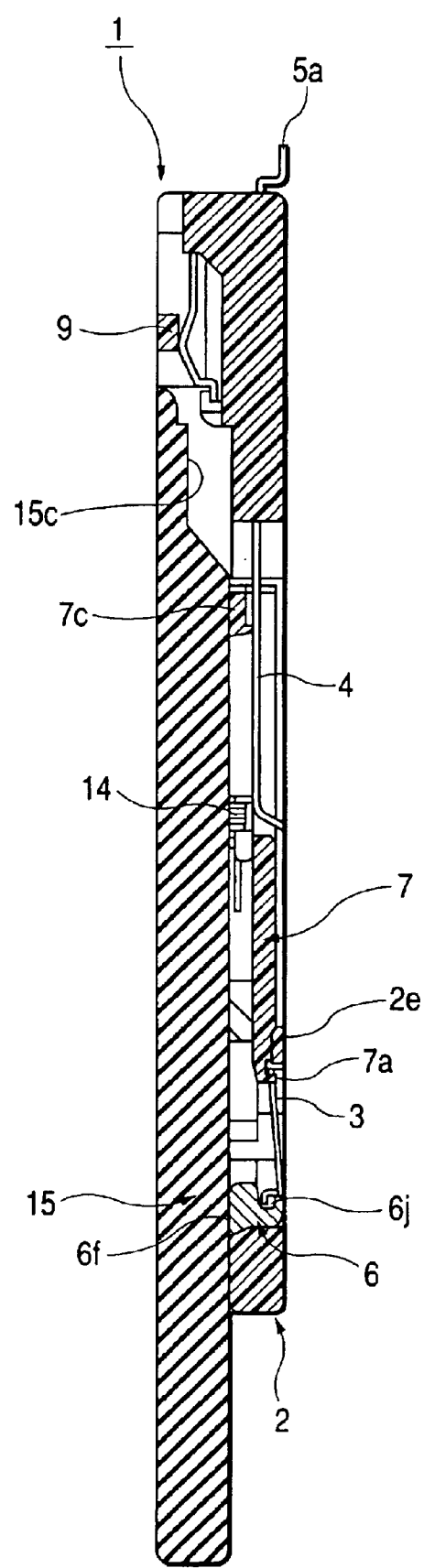
FIG. 28 is a view illustrating the mounting operation of the first card according to the present invention.

In addition, in order to eject the first card 15 positioned in the first card mounting position, when the first card 15 is inwardly pressed by a predetermined amount (push/push operation), the lock of the first sliding member 9 is released by the first slide pin 10 as the first locking member, the first sliding member 9 is pressed to the card insertion opening 2a by the biasing force of the first biasing member 11, and the first card 15 in the first card mounting position is ejected to a predetermined position shown in FIG. 26.

Then, an operator can take out the first card 15 outwardly ejected by the predetermined amount from the card insertion opening 2a. At this time, since the first card 15 is released from the pressure contact of the plurality of first terminal members 5, it can be took out by a small force.

The connector device 1 for card of the present invention securely guides the wide and thick first card 15 and the narrow and thin second card 16, which are in inclusive relation in the size of a section shape between them, by the guide member 6 and the elevation member 7, so that the cards 15 and 16 can be securely mounted in their respective card mounting positions.

In addition, since the first and second cards 15 and 16 mounted in their respective card mounting positions can be taken out of the first and second ejection mechanisms by a predetermined amount, it is easy to take out the first and second cards 15 and 16.

As described above, when the first card is inserted, since the second ejection mechanism can move to a position at which the insertion of the first card is not prevented, the first and second cards of different shapes having an inclusive relation in the size of the section shape can be smoothly inserted and mounted.

In addition, the first and second cards can be easily taken out by the first and second ejection mechanisms, respectively.

In addition, since the first ejection mechanism comprises the first sliding member, the first biasing member and the first locking member, and the second ejection mechanism comprises the second sliding member, the second biasing member and the second locking member, the first and second cards can securely be ejected to a predetermined ejection position by the first and second biasing members by push/push operating the first and second cards mounted in their respective card mounting positions.

An operator can take out the first and second cards ejected to the predetermined ejection positions since the pressure contact of the first and second terminal members is released.

In addition, since the second terminal member is pressed down to a position at which it does not contact the first card by the elevation member descended in connection with the insertion of the first card, when the first card is inserted, abrasion of the back side of the first card due to contact with the second terminal member can be prevented.

In addition, when the elevation member holding mechanism held in a state where the elevation member can eject the second card is arranged in the card insertion opening and the first card is inserted from the card insertion opening, since the elevation member ascends as the hold of the elevation member by the elevation member holding mechanism is released, the first and second cards can be securely mounted and ejected.

In addition, since the inclined wall inclined at a predetermined angle with respect to the insertion direction of the first and second cards is formed in the housing and the guide projections slidable along the inclined wall are formed in the elevation member, the elevation member is securely elevated along the inclined wall so that the first card can be securely mounted and ejected.

In addition, since a pair of the guide projections is formed with a predetermined gap between them and the elevation member can be elevated with the inclined wall inserted in the gap, the elevation member can be more securely elevated.

In addition, since the support portion capable of supporting the elevation member in an ascending position is formed in the inclined wall and the elevation member descends along the inclined wall as the support portion is pressed by the first card inserted in the card insertion opening so that the support by the support portion is released, the elevation member in the ascending position can be securely supported.

What is claimed is:

1. A connector device for card, comprising:

a housing; and a card insertion opening for inserting a first wide and thick card and a second narrow and thin card into the housing, wherein the housing is provided with a first ejection mechanism for ejecting the first card inserted into the housing and a second ejection mechanism for ejecting the second card, and wherein the second ejection mechanism is movable to a position which does not interfere with the insertion of the first card when the first card is inserted.

2. The connector device for card according to claim 1, wherein the first ejection mechanism includes a first sliding member slidable in connection with the first card inserted from the card insertion opening, a first biasing member for biasing the first sliding member in an ejection direction opposite to the insertion direction of the first sliding member, and a first locking member for locking the first sliding member in a first card mounting position against the biasing force of the first biasing member, and wherein the second ejection mechanism includes a second sliding member slidable in connection with the second card, inserted from the card insertion opening, a second biasing member for biasing the second sliding member in an ejection direction of the second sliding member, and a second locking member for locking the second sliding member in a second card mounting position against the biasing force of the second biasing member.

3. The connector device for card according to claim 1, wherein the second ejection mechanism is provided in an elevation member, which can ascend and descend in an upper and lower direction, and the elevation member descends in connection with the insertion of the first card.

4. The connector device for card according to claim 3, wherein the first card is formed to be longer than the second card, the housing is provided with a plurality of first terminal members inside the housing and a plurality of second terminal members in the front side close to the card insertion opening so as to correspond to a plurality of external contact portions formed in each of the first and second cards, the plurality of first terminal members capable of contacting the external contact portions of the first card, and the plurality of second terminal members capable of contacting the external contact portions of the second card, and wherein the second terminal member is pressed down to a position at which the second terminal member does not contact with the first card by the elevation member descended in connection with the insertion of the first card.

5. The connector device for card according to claim 4, wherein the card insertion opening is provided with an elevation member holding mechanism held in a state where the elevation member can eject the second card, and, when the first card is inserted from the card insertion opening, the hold of the elevation member by the elevation member holding mechanism is released so that the elevation member can be elevated.

6. The connector device for card according to claim 5, wherein the inclined wall inclined at a predetermined angle with respect to the insertion direction of the first and second cards is formed in the housing and guide projections slidable along the inclined wall are formed in the elevation member.

7. The connector device for card according to claim 6, wherein a pair of the guide projections is formed with a predetermined gap therebetween and the elevation member can be elevated with the inclined wall inserted in the gap.

8. The connector device for card according to claim 6, wherein a support portion capable of supporting the elevation member at an ascending position is formed in the inclined wall and the elevation member descends along the inclined wall as the support portion is pressed by the first card inserted in the card insertion opening, which releases the support by the support portion.

* * * * *